United States Patent [19]
Asano

[11] Patent Number: 5,815,664
[45] Date of Patent: Sep. 29, 1998

[54] ADDRESS REPORTING DEVICE AND METHOD FOR DETECTING AUTHORIZED AND UNAUTHORIZED ADDRESSES IN A NETWORK ENVIRONMENT

[75] Inventor: Kazuo Asano, Kawasaki, Japan

[73] Assignee: Fujitsu Limited, Kawasaki, Japan

[21] Appl. No.: 618,211

[22] Filed: Mar. 19, 1996

[30] Foreign Application Priority Data

Mar. 20, 1995 [JP] Japan .................................. 7-060189

[51] Int. Cl.⁶ .................................................. G06F 13/00
[52] U.S. Cl. .............................. 395/200.57; 395/200.47; 395/200.48; 395/200.49; 395/200.58; 395/200.79; 370/392; 370/393
[58] Field of Search ..................... 395/200.47, 200.48, 395/200.49, 200.57, 200.58, 200.79; 370/392, 393; 364/DIG. 1

[56] References Cited

U.S. PATENT DOCUMENTS

| | | | |
|---|---|---|---|
| 5,124,984 | 6/1992 | Engle | 370/94.1 |
| 5,526,489 | 6/1996 | Nilakantan et al. | 395/200.02 |
| 5,548,646 | 8/1996 | Aziz et al. | 380/23 |
| 5,568,487 | 10/1996 | Sitbon et al. | 370/94.1 |
| 5,636,216 | 6/1997 | Fox et al. | 370/40.2 |

FOREIGN PATENT DOCUMENTS

| | | |
|---|---|---|
| 5-344122 | 12/1993 | Japan . |
| 7-030575 | 1/1995 | Japan . |

*Primary Examiner*—Alyssa H. Bowler
*Assistant Examiner*—Dzung C. Nguyen
*Attorney, Agent, or Firm*—Staas & Halsey

[57] ABSTRACT

An address reporting device receives a query for an address corresponding to a machine name of a machine on a first network, from a second network. The address reporting device accesses name servers so as to determine whether or not the address corresponding to the machine name designated in the query is an unauthorized address. If it is determined that the address corresponding to the machine name designated in the query is an unauthorized address, the address reporting device searches an address pair register table and/or an address mapping table stored in a router equipped with address translation function so as to specify an appropriate authorized address corresponding to the unauthorized address and prepares an address pair formed by the specified authorized address and the unauthorized address. The address pair is registered in the address pair register table. The address reporting device returns the authorized address forming the pair to the second network.

25 Claims, 13 Drawing Sheets

FIG. 6

| UNAUTHORIZED ADDRESS | AUTHORIZED ADDRESS |
|---|---|
| 10.0.0.1 | 133.160.29.1 |
| 10.0.0.2 | 133.180.29.2 |
| 10.10.0.1 | 133.160.30.1 |

| UNAUTHORIZED ADDRESS | AUTHORIZED ADDRESS |
|---|---|
| 10.0.0.1 | 133.160.29.1 |
| 10.0.0.2 | 133.160.29.2 |
| 10.0.0.3 | 133.160.29.3 |
| 10.0.1.3 | 133.160.29.10 |
| 10.10.0.1 | 133.160.30.1 |
| 10.10.1.1 | 133.160.30.2 |

| | UNAUTHORIZED ADDRESS | AUTHORIZED ADDRESS |
|---|---|---|
| (a) → | 10.0.0.1 | 133.160.29.1 |
| (b) → | 10.0.0.2-128 | 133.160.29.2 |
| (c) → | 10.0.0.129-254 | 133.160.29.3-15 |
| (d) → | 10.0.0.n | 133.160.30.n |
| (e) → | 10.0.1-10.1 | 133.160.31.1-10 |
| (f) → | 10.0.n.2 | 133.160.32.n |
| (g) → | 10.0.1-10.* | 133.160.29.1-10 |
| (h) → | 10.*.1-10.* | 133.160.29.1-10 |
| (i) → | 10.0.*.* | 133.160.29.1-255 |
| (j) → | 10.1.*.* | 133.160.33-34.* |
| (k) → | 10.1.*.1 | 133.160.33-34.* |
| (ℓ) → | 10.1.*.2 | 133.160.33-34.* |

32b

| ROUTING TABLE | |
|---|---|
| DESTINATION ADDRESS | NEXT HOP |
| 133.160.10.0 | 133.160.10.1 |
| 133.160.20.0 | 133.160.10.2 |
| 133.160.30.0 | 133.160.30.2 |
| 133.160.40.0 | 133.160.30.1 |

ADDRESS REPORTING DEVICE AND METHOD FOR DETECTING AUTHORIZED AND UNAUTHORIZED ADDRESSES IN A NETWORK ENVIRONMENT

BACKGROUND OF THE INVENTION

1. Field of the Invention

The present invention relates to address reporting methods, address reporting apparatuses and address reporting systems, and more particularly, to an address reporting method, an address reporting method and an address reporting system in which a query for an address bound to a specific name for a machine (host), issued across mutually communicable networks constituting a larger network, is responded to with the requested address.

2. Description of the Prior Art

Recently, various types of networks enabling communication between terminals such as computers have been built. Especially favored of all these types of networks is an network in which the Internet Protocol is used (hereinafter, such a network is referred to as the IP network). The IP network has started as a technology for connecting computers having different architectures. Nowadays, an increasing number of IP networks are connected to each other so as to form a giant network of a global scale (the global Internet). End-to-end communication between machines that are placed around the world and connected to the IP network is enabled.

For end-to-end communication between the machines, each of the machines that constitute the IP network must have a unique IP address assigned thereto. The only agent on the globe responsible for maintenance of the addresses is the Network Information Center (NIC). An address in the IP network consists of 32 bits so that the number of addresses assignable to machines is limited. Due to a rapid increase in the number of machines connected to the IP network, a problem of shortage of addresses has surfaced.

Therefore, it is difficult for networks of a corporation, a research organization, a university or a college participating in the IP network to acquire from the NIC as many addresses as machines (hosts) that the networks are provided with. As a result, a network accommodating hosts totaling a number larger than the number of addresses acquired from the NIC includes hosts having an address defined independently by the network, i.e. a private address (hereinafter, referred to as an unauthorized address) which is strictly for use inside the network and which can not be recognizably reported outside the associated network, in addition to hosts that are assigned an address acquired from the NIC (hereinafter, referred to as an authorized address).

While a host having an unauthorized address is able to communicate with hosts inside the network to which it belongs, it can not make itself known outside the network using the unauthorized address. Therefore, communication with hosts on another network is prevented. One approach to avoid this problem is for a host having an unauthorized address to log in to an intermediary host on the same network having an authorized address. Thereupon, the intermediary host accesses a host outside that network for communication therewith. In this scheme, however, an inherent advantage of the IP network by which direct end-to-end communication between hosts is enabled is lost.

For example, rfc 1631 issued by the Internet Architecture Board describes the IP Network Address Translator by which the address inside a stub domain can be reused by any other stub domain.

Further, Japanese Laid-Open Patent Application No. 5-344122 proposes a method that enables communication between a host having an unauthorized address with a host outside the network without involving an intermediary host having an authorized address. The above-identified application discloses a method whereby a host having an unauthorized address accesses a host on another network having an authorized address so as to start communication between the two hosts.

More specifically, a packet (an IP packet) issued by a host having an unauthorized address and delivered outside a network has the unauthorized address specified in the source address field. An authorized address of a destination is specified in the destination address field of the IP packet. The packet is delivered outside the network via a router. The router translates the unauthorized address of the packet to an authorized address that is not currently used inside the network, before delivering the packet outside the network. An address pair consisting of the unauthorized address and the authorized address is stored in the router so that it is possible for the router to select a packet having the stored authorized address specified in the destination address field and translate the authorized address in the destination address field in the packet to the authorized address.

Thus, it is possible for a host having an unauthorized address, as well as a host having an authorized address, to access a host having an authorized address outside the network via the router and send calculation data or the like to the destination. It is possible for the accessed host outside the network to respond to the host having the unauthorized host.

A conceivable alternative approach is to introduce a proxy connection system (called socks) in a host having an authorized address and accessible both from a host having an unauthorized address and from an authorized address outside the network. In this approach, the host having the unauthorized address issues a request for a proxy connection to the proxy connection system in order to communicate with the host outside the network.

In the aforementioned conventional methods, however, the address pair consisting of the authorized address and the unauthorized address is created and registered in the router only when the first packet, issued by the host having the unauthorized address on the network to the host having the authorized address outside the network, passes the router. The packet exchanged between the hosts is subjected to address translation each time it passes the router so as to enable communication between the hosts. Hence, there is a problem in that it is impossible to send a packet to the host having an unauthorized address not registered in the router, from outside the network.

More specifically, although the conventional methods allow a host having an unauthorized address to access a host having an authorized address outside the network so as to enter communication therewith, it is not always possible for a host having an authorized address outside the network to access a host having an unauthorized address inside the network.

The Domain Name System (DNS) for mapping between host names and addresses is employed in the IP network. The DNS allows an operator to specify a destination host using a domain name instead of numerals is not required. For example, a host in Japan may have a domain name "*@lab.abcde.co.jp". The rightmost label "jp" indicates that it is a Japanese host. The label "co" indicates a corporate host. The next label "abcde" is a unique name that the corporate host has obtained. Generally, a corporate name or an abbreviation is used. The label entered in this part of the domain name is called a Fully Qualified Domain Name. The next label "lab" is a label that branches off the "abcde" domain. In this case, this label may indicate the laboratory of the abcde company. Generally, a user name of the host is entered in the section indicated by "*". In addition to the "co" label described above, "ac" (academic organization like universities or schools), "go" (government organizations), "or" (non-profit corporate bodies or organizations not belonging to the realm specified by "ac", "co" or "go") and "ad" (network administrator organizations) are used as labels in Japan.

The DNS is built upon a name server, and a name resolver which processes translation (hereinafter, referred to as "resolution") between names and addresses using at least one name server. The name server often refers to hardware that runs a server program for mapping between domain names and IP addresses. More specifically, it inclusively refers to a machine that executes a server program and a database from which addresses can be retrieved.

An operation of a name server will be described with reference to a conceptual tree shown in FIG. 1. The name resolver that receives a query for an address bound to a host name needs to know to which name server it should contact for the query. Normally, the namer server that administers the domain in which the name resolver is located is contacted. For reliability, a query may be issued to a plurality of name servers. This ensures a continuous operation in the event of a machine failure of a name server. The name server that has received a request from the name resolver decides whether or not it is capable of the resolution, that is, whether or not the resolution can take place in a network or a subnetwork it administers. When it is decided that the name server contacted is incapable of the resolution, the name server issues a query to an immediately superior name server or a root name server.

For example, when there is a query requesting an address that corresponds to a host name "*@lab.abcde.co.jp" from a host administered by a name server for the domain "ac", the name resolver issues a query to the name server for the domain "ac". Since the name server for the domain "ac" does not administers the designated host name, the name server passes the query to a name server for the superior domain "jp". The name server for the domain "jp" then knows that the designated host name contains the domain name "co" for which it is an authority. Thus, the name server instructs the name server for the domain "ac" to contact the name server for the domain "co". The name server for the domain "ac" is directed by name servers lower in the hierarchy than the name server for the domain "co" to contact a chain of name servers. Upon finding the name server that administers the domain "*", the name server for the domain "ac" receives the address that corresponds to the designated host name. It will be noted that the conceptual tree of FIG. 1 is shown so as to facilitate understanding of name servers. Links in the tree of FIG. 1 do not indicate physical network connections. In practice, the servers may be located at arbitrary locations on an internet.

The DNS constructed as above may be considered as a distributed administration system in which the mapping between host names and addresses can be formed and modified in individual networks participating in the IP network. In the DNS, an operator need not know correspondence between the name of a host in another network and an address thereof. When the operator knows the host name of the destination host, the terminal that the operator uses automatically supplies a query in the network for the authorized address bound to the host name.

According to the DNS, a query for an address bound to a host having an authorized address is responded to by an authorized address. A host having an unauthorized address is capable of communicating with a host having an authorized address, using a conventional router. However, a query for an address of a host having an unauthorized address is responded to with an answer that there is no corresponding authorized address. Therefore, access to a host having an unauthorized address and communication therewith is disabled according to the conventional method.

If a proxy connection system is introduced in a host having an authorized address, an inherent advantage of the IP network by which direct end-to-end communication between hosts is enabled is maintained. However, proprietary commands must be introduced in the machines that have unauthorized addresses and use the proxy connection system, thus imposing a load on the user.

SUMMARY OF THE INVENTION

Accordingly, a general object of the present invention is to provide an address reporting apparatus, an address reporting method and an address reporting system in which the aforementioned problems are eliminated.

Another and more specific object of the present invention is to enable a host having an unauthorized address to respond to a request for communication therewith from a host on another network and communicate with the requesting host, even if the host having the unauthorized address has never communicated with a host on another network.

Still another object of the present invention is to ensure that, in event of a query from a host on another network for an address of a host having an unauthorized address, connection between the host on the other network and the host having the unauthorized address is successfully established so that communication therebetween is enabled.

In order to achieve the aforementioned objects, the present invention provides an address reporting method for returning, when a query requesting an address corresponding to a machine name of a machine on a first network provided with an authorized address and an unauthorized address is issued from a second network, the requested address to the second network, the address reporting method comprising the steps of: a) receiving a query for the address from the second network; b) determining whether or not the address corresponding to the machine name designated in the query received in step a) is the unauthorized address; c) preparing, when it is determined through step b) that the address corresponding to the machine name designated in the query is the unauthorized address, an address pair formed by the unauthorized address and the authorized address; d) registering the address pair prepared in step c) in an address pair register table; and e) returning the authorized address forming the address pair to the second network, when it is determined through step b) that the address corresponding to the machine name designated in the query is the unauthorized address. According to the address reporting method of the present invention, when it is determined that the address corresponding to a host name designated in a query from second network is an unauthorized address, an address pair formed of the unauthorized address and the authorized address is prepared and registered in the address pair register table. The authorized address forming the address pair is returned as a response to the query. By referring to the address pair register table, it is possible to translate the authorized destination address of the packet sent from the second network to a machine having the unauthorized address on the first network, to the unauthorized address, and also to translate the source address of the packet sent from the machine having the unauthorized address on the first network to the second network, to the authorized address. Therefore, a connection request issued from a machine on the second network to the machine having the unauthorized address on the first network can be properly processed. Communication between the machines on the respective networks can be effected once the request is acknowledged.

The aforementioned objects of the present invention can also be accomplished by an address reporting method for returning, when a query requesting an address corresponding to a machine name for a machine on a first network provided with a plurality of authorized addresses and a plurality of unauthorized addresses is issued from a second network, the requested address to the second network, the address reporting method comprising the steps of: a) receiving a query for the address from the second network; b) determining whether or not the address corresponding to the machine name designated in the query received in step a) is one of the plurality of unauthorized addresses; c) preparing, when it is determined through step b) that the address corresponding to the machine name designated in the query is the unauthorized address, an address pair formed by the unauthorized address and the one of the plurality of authorized addresses; d) registering the address pair prepared in step c) in an address pair register table; and e) returning the authorized address forming the address pair to the second network, when it is determined through step b) that the address corresponding to the machine name designated in the query is one of the plurality of unauthorized addresses. According to this aspect of the present invention, the first network is assumed to have a plurality of authorized addresses and a plurality of unauthorized addresses. When it is determined that the address corresponding to the machine name designated in the query is one of the plurality of unauthorized addresses, an address pair formed of the unauthorized address and one of the plurality of authorized addresses is prepared and registered in the address pair register table. The authorized address is returned as a response to the query. By referring to the address pair register table, it is possible to translate the authorized destination address of the packet sent from the second network to the machine having the unauthorized address on the first network, to the unauthorized address, and also to translate the source address of the packet sent from the machine having the unauthorized address on the first network to the second network, to the authorized address. A connection request issued from the machine on the second network to the machine having the unauthorized address on the first network can be properly processed. Communication between the machines on the respective networks can be effected once the request is acknowledged. Moreover, connection requests to a plurality of machines having unauthorized addresses can be processed using a corresponding number of authorized addresses. Authorized addresses should be assigned only to those machines engaged with communication with a machine outside the network, instead of all the machines having the unauthorized addresses. Therefore, a supply authorized addresses can be efficiently used.

Preferably, there is provided an address mapping table by which one of the plurality of authorized addresses can be identified by specifying one of the unauthorized addresses, the address reporting method further comprising the step of f) reading, when it is determined through step b) that the address corresponding to the machine name designated in the query from the second network is one of the plurality of unauthorized addresses, one of the authorized addresses registered in the address mapping table, and the address pair including the authorized address read through step f) being prepared through step c). According to this aspect of the present invention, when it is determined that the address corresponding to the machine name designated in the query from the second network is one of the plurality of unauthorized addresses, the authorized address corresponding to the unauthorized address is retrieved from the address mapping table. An address pair is formed of the retrieved authorized address and the unauthorized address. The user holds control over a choice of the authorized address forming the address pair.

The address reporting method may comprise the steps of: g) determining, when it is determined that the address corresponding to the machine name designated in the query is one of the plurality of unauthorized addresses, whether or not the address pair that contains the unauthorized address corresponding to the host name designated in the query is registered in the address pair register table; h) reading, when it is determined through step g) that the address pair that contains the unauthorized address corresponding to the machine name designated in the query is registered in the address pair register table, the authorized address forming the address pair from the address pair register table; i) specifying, when it is determined through step g) that the address pair that contains the unauthorized address corresponding to the machine name designated in the query is not registered in the address pair register table, one of the plurality of authorized addresses not registered in the address pair register table; j) registering an address pair formed by the unauthorized address corresponding to the machine name designated in the query and the authorized address specified through step i) in the address pair register table, wherein when the authorized address is read from the address pair register table through step h), the authorized address read is returned to the second network in step e), and when the authorized address is specified through step i), the specified address is returned to the second network in step e). According to this aspect of the present invention, when it is determined that the address corresponding to the machine name designated in the query is one of the plurality of unauthorized addresses, and when the address pair that contains the unauthorized address corresponding to the machine name designated in the query is registered in the address pair register table, the authorized address forming the address pair is retrieved from the address pair register table and returned to the second network. When the relevant address pair is not registered in the address pair register table, one of the authorized addresses not registered in the address pair register table is specified so that the address pair formed by the unauthorized address corresponding to the machine name designated in the query and the specified authorized address is registered in the address pair register table. The specified authorized address is returned to the second network. As a result of this process, a subsequent query for the address of the machine having the unauthorized address that forms the address pair can be replied to with the authorized address forming the address pair. In this way, creation of two address pairs in which the same unauthorized address is bound to two authorized addresses is prevented. By not preparing an address pair and registering the same each time it is necessary to bind the unauthorized address to the authorized address, it is possible to reduce a time that it takes to return the requested address. In the event that the address pair that contains the unauthorized address corresponding to the machine name designated in the query is not registered in the address pair register table, an authorized address not registered in the address pair register table is specified so as to form a new address pair. In this way, it is possible to prevent the same authorized address from being used in different communication sessions.

Preferably, there is provided an address mapping table by which one of the plurality of authorized addresses can be identified by specifying one of the unauthorized addresses, the address mapping table being searched in step i) so as to specify one of the authorized addresses forming a pair with the unauthorized address corresponding to the machine name designated in the query from the second network, and the address reporting method further comprising the step of k) reading the authorized address specified in step i) from the address mapping table. According to this aspect of the present invention, an authorized address bound to the unauthorized address corresponding to the machine name designated in the query is retrieved from the address mapping table so as to form a new address pair. The retrieved address is returned to the second network. In this way, specification of the address is easy.

Preferably, the address reporting method may further comprise the steps of: 1) adding data relating to a permitted survival period to information returned to the second network; and m) deleting from the address pair register table the address pair that contains the authorized address returned to the second network after the permitted survival period has expired. According to this aspect of the present invention, data indicating a permitted survival period is added to information returned to the second network. When the permitted survival period has expired, the address pair that contains the authorized address returned to the second network is deleted from the address pair register table. As a result of this, the pair formed by the authorized address and the unauthorized address can remain registered in the address pair register table only while the authorized address is used in the network. An inconvenience such as a continued use of the authorized returned address even after the deletion of the address pair can be avoided.

In a preferred embodiment, the address reporting method may further comprise the steps of: n) adding data relating to an permitted survival period to information returned to the second network; and o) deleting from the address pair register table the address pair that contains the authorized address returned to the second network, wherein the permitted survival period is set to match a registration period during which the address pair can remain registered in the address pair register table. According to this aspect of the present invention, the permitted survival period of the authorized address is set to match the registration period during which the address pair that contains the authorized address can remain registered in the address pair register table. As a result of this scheme, an inconvenience in which the authorized address returned in response to the query continues to be used even after the deletion of the address pair, is avoided. The authorized address that is no longer in use in the network is made available by being immediately deleted from the address pair register table. In this way, the supply of authorized addresses can be used efficiently.

In still another preferred embodiment, the address reporting method may further comprise the steps of: p) adding data relating to an permitted survival period to information returned to the second network; and q) deleting from the address pair register table the address pair that contains the authorized address returned to the second network, wherein the permitted survival period is set such that it matches a registration period during which the address pair can remain registered in the address pair register table, and is in inverse proportion to the number of addresses pairs registered in the address pair register table. In accordance with this aspect of the present invention, the permitted survival period of the authorized address is set to match the registration period of the address pair and is in inverse proportion to the number of address pairs registered in the address pair register table. Therefore, a given authorized address forming the address pair can be used repeatedly over an extensive period of time when there are a large number of authorized addresses available. This arrangement also ensures that authorized addresses are not depleted even when the number of available authorized addresses becomes small. In this way, it is possible to use a limited supply of authorized addresses efficiently.

The aforementioned objects of the present invention may also be accomplished by an address reporting apparatus for returning, when a query for an address corresponding to a machine name of a machine on a first network is issued from a second network, the requested address to the second network, using authorized address storing means for storing an authorized address in the first network, the address reporting apparatus comprising: unauthorized address storing means storing an unauthorized address in the first network; receiving means receiving the query for the address from the second network; address determining means determining whether the address corresponding to the machine name designated in the query received by the receiving means is the authorized address stored in the authorized address storing means or the unauthorized address stored in the unauthorized address storing means; address pair preparing means preparing, when it is determined by the address determining means that the address corresponding to the machine designated in the query is the unauthorized address, the address pair formed by the unauthorized address and the authorized address; address pair registering means storing the address pair prepared by the address pair preparing means in an address pair register table; and address reporting means reporting, when it is determined by the address determining means that the address corresponding to the machine name designated in the query is the unauthorized address, the authorized address forming the address pair with the unauthorized address to the second network. According to the address reporting apparatus of the present invention, when it is determined that the address corresponding to the machine name designated in the query from the second network is an unauthorized address, an address pair formed by the unauthorized address and the authorized address is prepared and registered in the address pair register table. The authorized address forming the address pair is returned in response to the query. By referring to the address pair register table, it is possible to translate the authorized destination address of the packet sent from the second network to a machine having the unauthorized address on the first network, to the unauthorized address, and also to translate the source address of the packet sent from the machine having the unauthorized address on the first network to the second network, to the authorized address. Therefore, a connection request issued from a machine on the second network to the machine having the unauthorized address on the first network can be properly processed. Communication between the machines on the respective networks can be effected once the request is acknowledged.

The aforementioned objects of the present invention can also be accomplished by an address reporting apparatus for returning, when a query for an address corresponding to a machine name of a machine on a first network is issued from a second network, the requested address to the second network, using authorized address storing means for storing a plurality of authorized addresses in the first network, the address reporting apparatus comprising: unauthorized address storing means storing a plurality of unauthorized addresses in the first network; receiving means receiving the query for the address from the second network; address determining means determining whether the address corresponding to the machine name designated in the query received by the receiving means is one of the plurality of authorized addresses stored in the authorized address storing means or one of the plurality of unauthorized addresses stored in the unauthorized address storing means; address pair preparing means preparing, when it is determined by the address determining means that the address corresponding to the machine designated in the query is one of the plurality of unauthorized addresses, the address pair formed by the unauthorized address and one of the plurality of authorized addresses; address pair registering means storing the address pair prepared by the address pair preparing means in an address pair register table; and address reporting means reporting, when it is determined by the address determining means that the address corresponding to the machine name designated in the query is one of the plurality of unauthorized addresses, the authorized address forming the address pair with the unauthorized address to the second network. According to this aspect of the present invention, it is assumed that the first network contains a plurality of authorized addresses and a plurality of unauthorized addresses. When it is determined that the address corresponding to the machine name designated in the query is one of the plurality of unauthorized addresses, an address pair formed by the unauthorized address and the one of the plurality of authorized addresses is prepared and registered in the address pair register table. The authorized address forming the address pair is returned to the query. By referring to the address pair register table, it is possible to translate the authorized destination address sent for the second network to the machine having an unauthorized address on the first network, to the unauthorized address, and also to translate the source address of the packet sent from the machine having an unauthorized address on the first network to the second network, to the authorized address. Therefore, a connection request issued from a machine on the second network to the machine having the unauthorized address on the first network can be properly processed. Communication between the machines on the respective networks can be effected once the request is acknowledged. A plurality of communication requests to a plurality of machines having unauthorized addresses can be processed using a corresponding number of authorized addresses. In this way, a plurality of authorized addresses can be used efficiently.

In one preferred embodiment of the address reporting apparatus, there is provided an address mapping table by which one of the plurality of authorized addresses can be identified by specifying one of the unauthorized addresses, the address reporting apparatus further comprising address mapping table reading means reading, when it is determined by the address determining means that the address corresponding to the machine name designated in the query from the second network is one of the plurality of unauthorized addresses, one of the authorized addresses registered in the address mapping table, and the address pair preparing means preparing the address pair that contains the authorized address read by the address mapping table reading means. According to this aspect of the present invention, when it is determined that the address corresponding to the machine name designated in the query from the second network is one of the plurality of authorized addresses, an authorized address bound to the unauthorized address in the address mapping table is retrieved from the address mapping table. The address pair is formed by the retrieved authorized address. In this way, it is easy to specify the authorized address forming the address pair.

The address reporting apparatus may further comprise: registration determining means determining, when it is determined that the address corresponding to the machine name designated in the query is one of the plurality of unauthorized addresses, whether or not the address pair that contains the unauthorized address corresponding to the machine name designated in the query is registered in the address pair register table; address pair register table reading means reading, when it is determined by the registration determining means that the address pair that contains the unauthorized address corresponding to the machine name designated in the query, the authorized address forming the address pair from the address pair register table; address specifying means specifying, when it is determined by the registration determining means that the address pair that contains the unauthorized address corresponding to the machine name designated in the query is not registered in the address pair register table, one of the authorized addresses from among the plurality of authorized addresses not registered in the address pair register table, wherein the address pair registering means registers the address pair formed by the address corresponding to the machine name designated in the query and the authorized address specified by the address specifying means, in the address pair register table, and the address reporting means returns, when the authorized address is read by the address pair register table reading means from the address pair register table, the authorized address read to the second network, or returns, when one of the authorized addresses is specified by the address specifying means, the specified authorized address to the second network. According to this aspect of the present invention, when it is determined that the address corresponding to the machine name designated in the query is one of the plurality of unauthorized addresses, and when the address pair that contains the unauthorized address corresponding to the designated machine name is registered in the address pair register table, the authorized address forming the address pair is retrieved from the address pair register table and returned to the second network. If the address corresponding to the designated machine name is not registered in the address pair register table, one of the authorized addresses not registered in the address pair register table is specified the address pair formed by the unauthorized address corresponding to the designated machine name and the specified authorized address is registered in the address pair register table. The specified authorized address is returned to the second network. As a result of this process, a subsequent query for the address of the machine having the unauthorized address that forms the address pair can be replied to with the authorized address forming the address pair. It is not necessary to prepare an address pair and register the same each time such a query occurs. In the event that the address pair that contains the unauthorized address corresponding to the machine name designated in the query is not registered in the address pair register table, an authorized address not registered in the address pair register table is specified so as to form a new address pair. In this way, it is possible to prevent the same authorized address from being used in different communication sessions.

In a preferred embodiment, the address there is provided an address mapping table by which one of the plurality of authorized addresses can be identified by specifying one of the unauthorized addresses, and the address specifying means searches the address mapping table so as to read therefrom one of the authorized addresses forming a pair with the unauthorized address corresponding to the machine name designated in the query from the second network. According to this aspect of the present invention, the authorized address is specified such that an authorized address bound to the unauthorized address corresponding to the machine name designated in the query from the second network is retrieved from the address mapping table so as to form a new address pair. The retrieved authorized address is returned to the second network. In this way, specification of the address is easy.

In another preferred embodiment, the address reporting apparatus may further comprise: permitted survival period data adding means adding data relating to an permitted survival period of information returned to the second network; and address pair deleting means deleting the address pair that contains the authorized address returned to the second network from the address pair register table when the permitted survival period has expired. According to this aspect of the present invention, data indicating a permitted survival period is added to information returned to the second network. When the permitted survival period has expired, the address pair that contains the authorized address returned to the second network is deleted from the address pair register table. As a result of this, the pair formed by the authorized address and the unauthorized address can remain registered in the address pair register table only while the authorized address is used in the network. An inconvenience such as a continued use of the authorized returned address even after the deletion of the address pair can be avoided.

The address reporting apparatus may further comprise: permitted survival period data adding means adding data relating to an permitted survival period to information returned to the second network; and address pair deleting means deleting the address pair that contains the authorized address returned to the second network from the address pair register table, wherein the permitted survival period is set to match a registration period during which the address pair can remain registered in the address pair register table. According to the this aspect of the present invention, the permitted survival period of the authorized address is set to match the registration period during which the address pair that contains the authorized address can remain registered in the address pair register table. As a result of this scheme, an inconvenience in which the authorized address returned in response to the query continues to be used even after the deletion of the address pair, is avoided. The authorized address that is no longer in use in the network is made available by being immediately deleted from the address pair register table. In this way, the supply of authorized addresses can be used efficiently.

The address reporting apparatus may further comprise: permitted survival period data adding means adding data relating to an permitted survival period to information returned to the second network; and address pair deleting means deleting the address pair that contains the authorized address returned to the second network from the address pair register table, wherein the permitted survival period is set such that it matches a registration period during which the address pair can remain registered in the address pair register table, and is in inverse proportion to the number of addresses pairs registered in the address pair register table. According to this aspect of the present invention, the permitted survival period of the authorized address is set such that it matches the registration period of the address pair and is in inverse proportion to the number of address pairs registered in the address pair register table. Therefore, a given authorized address forming the address pair can be used repeatedly over an extensive period of time when there are a large number of authorized addresses available. This arrangement also ensures that authorized addresses are not depleted even when the number of available authorized addresses becomes small. In this way, it is possible to use a limited supply of authorized addresses efficiently.

The aforementioned objects of the present invention can also be accomplished by an address reporting system for returning, when a query for an address corresponding to a machine name of a machine on a first network having an authorized address and an unauthorized address is issued from a second network communicable with the first network, the requested address to the second network, said address reporting system comprising: authorized address storing means storing an authorized address; unauthorized address storing means storing an unauthorized address; receiving means receiving the query for the address from the second network; address determining means determining whether the address corresponding to the machine name designated in the query received by the receiving means is the authorized address stored in the authorized address storing means or the unauthorized address stored in the unauthorized address storing means; address pair preparing means preparing, when it is determined by the address determining means that the address corresponding to the machine designated in the query is the unauthorized address, the address pair formed by the unauthorized address and the authorized address; address pair registering means storing the address pair prepared by the address pair preparing means in an address pair register table; and address reporting means reporting, when it is determined by the address determining means that the address corresponding to the machine name designated in the query is the unauthorized address, the authorized address forming the address pair with the unauthorized address to the second network. According to this aspect of the present invention, when it is determined that the address corresponding to a host name designated in a query from second network is an unauthorized address, an address pair formed of the unauthorized address and the authorized address is prepared and registered in the address pair register table. The authorized address forming the address pair is returned as a response to the query. By referring to the address pair register table, it is possible to translate the authorized destination address of the packet sent from the second network to a machine having the unauthorized address on the first network, to the unauthorized address, and also to translate the source address of the packet sent from the machine having the unauthorized address on the first network to the second network, to the authorized address. Therefore, a connection request issued from a machine on the second network to the machine having the unauthorized address on the first network can be properly processed. Communication between the machines on the respective networks can be effected once the request is acknowledged.

The aforementioned objects of the present invention can also be accomplished by an address reporting system for returning, when a query for an address corresponding to a machine name of a machine on a first network having a plurality of authorized addresses and a plurality of unauthorized addresses is issued from a second network communicable with the first network, the requested address to the second network, said address reporting system comprising: authorized address storing means storing the plurality of authorized addresses; unauthorized address storing means storing the plurality of unauthorized addresses; receiving means receiving the query for the address from the second network; address determining means determining whether the address corresponding to the machine name designated in the query received by the receiving means is the authorized address stored in the authorized address storing means or the unauthorized address stored in the unauthorized address storing means; address pair preparing means preparing, when it is determined by the address determining means that the address corresponding to the machine designated in the query is the unauthorized address, the address pair formed by the unauthorized address and the authorized address; address pair registering means storing the address pair prepared by the address pair preparing means in an address pair register table; and address reporting means reporting, when it is determined by the address determining means that the address corresponding to the machine name designated in the query is the unauthorized address, the authorized address forming the address pair with the unauthorized address to the second network. According to this aspect of the present invention, it is assumed that the first network contains a plurality of authorized addresses and a plurality of unauthorized addresses. When it is determined that the address corresponding to the machine name designated in the query is one of the plurality of unauthorized addresses, an address pair formed by the unauthorized address and the one of the plurality of authorized addresses is prepared and registered in the address pair register table. The authorized address forming the address pair is returned to the query. By referring to the address pair register table, it is possible to translate the authorized destination address sent for the second network to the machine having an unauthorized address on the first network, to the unauthorized address, and also to translate the source address of the packet sent from the machine having an unauthorized address on the first network to the second network, to the authorized address. Therefore, a connection request issued from a machine on the second network to the machine having the unauthorized address on the first network can be properly processed. Communication between the machines on the respective networks can be effected once the request is acknowledged. A plurality of communication requests to a plurality of machines having unauthorized addresses can be processed using a corresponding number of authorized addresses. In this way, a plurality of authorized addresses can be used efficiently.

In a preferred embodiment of the address reporting system, there is provided an address mapping table by which one of the plurality of authorized addresses can be identified by specifying one of the unauthorized addresses, said address reporting system further comprising address mapping table reading means reading, when it is determined by the address determining means that the address corresponding to the machine name designated in the query from the second network is one of the plurality of unauthorized addresses, one of the authorized addresses registered in the address mapping table, and the address pair preparing means preparing the address pair that contains the authorized address read by the address mapping table reading means. According to this aspect of the present invention, when it is determined that the address corresponding to the machine name designated in the query from the second network is one of the plurality of authorized addresses, an authorized address bound to the unauthorized address in the address mapping table is retrieved from the address mapping table. The address pair is formed by the retrieved authorized address. In this way, it is easy to specify the authorized address forming the address pair.

The address reporting system may further comprise: registration determining means determining, when it is determined that the address corresponding to the machine name designated in the query is one of the plurality of unauthorized addresses, whether or not the address pair that contains the unauthorized address corresponding to the machine name designated in the query is registered in the address pair register table; address pair register table reading means reading, when it is determined by the registration determining means that the address pair that contains the unauthorized address corresponding to the machine name designated in the query, the authorized address forming the address pair from the address pair register table; address specifying means specifying, when it is determined by the registration determining means that the address pair that contains the unauthorized address corresponding to the machine name designated in the query is not registered in the address pair register table, one of the authorized addresses from among the plurality of authorized addresses not registered in the address pair register table, wherein the address pair registering means registers the address pair formed by the address corresponding to the machine name designated in the query and the authorized address specified by the address specifying means, in the address pair register table, and the address reporting means returns, when the authorized address is read by the address pair register table reading means from the address pair register table., the authorized address read to the second network, or returns, when one of the authorized addresses is specified by the address specifying means, the specified authorized address to the second network. According to this aspect of the present invention, when it is determined that the address corresponding to the machine name designated in the query is one of the plurality of unauthorized addresses, and when the address pair that contains the unauthorized address corresponding to the machine name designated in the query is registered in the address pair register table, the authorized address forming the address pair is retrieved from the address pair register table and returned to the second network. When the relevant address pair is not registered in the address pair register table, one of the authorized addresses not registered in the address pair register table is specified so that the address pair formed by the unauthorized address corresponding to the machine name designated in the query and the specified authorized address is registered in the address pair register table. The specified authorized address is returned to the second network. As a result of this process, a subsequent query for the address of the machine having the unauthorized address that forms the address pair can be replied to with the authorized address forming the address pair. It is not necessary to prepare an address pair and register the same each time such a query occurs. In the event that the address pair that contains the unauthorized address corresponding to the machine name designated in the query is not registered in the address pair register table, an authorized address not registered in the address pair register table is specified so as to form a new address pair. In this way, it is possible to prevent the same authorized address from being used in different communication sessions.

In a preferred embodiment of the address reporting system, there is provided an address mapping table by which one of the plurality of authorized addresses can be identified by specifying one of the unauthorized addresses, and the address specifying means searches the address mapping table so as to read therefrom one of the authorized addresses forming a pair with the unauthorized address corresponding to the machine name designated in the query from the second network. According to an authorized address bound to the unauthorized address corresponding to the machine name designated in the query is retrieved from the address mapping table so as to form a new address pair. The retrieved address is returned to the second network. In this way, specification of the address is easy.

The address reporting system may further comprise: permitted survival period data adding means adding data relating to an permitted survival period of information returned to the second network; and address pair deleting means deleting the address pair that contains the authorized address returned to the second network from the address pair register table when the permitted survival period has expired. According to this aspect of the present invention, data indicating a permitted survival period is added to information returned to the second network. When the permitted survival period has expired, the address pair that contains the authorized address returned to the second network is deleted from the address pair register table. As a result of this, the pair formed by the authorized address and the unauthorized address can remain registered in the address pair register table only while the authorized address is used in the network. An inconvenience such as a continued use of the authorized returned address even after the deletion of the address pair can be avoided.

The address reporting system may further comprise: permitted survival period data adding means adding data relating to an permitted survival period to information returned to the second network; and address pair deleting means deleting the address pair that contains the authorized address returned to the second network from the address pair register table, wherein the permitted survival period is set to match a registration period during which the address pair can remain registered in the address pair register table. According to this aspect of the present invention, the permitted survival period of the authorized address is set to match the registration period during which the address pair that contains the authorized address can remain registered in the address pair register table. As a result of this scheme, an inconvenience in which the authorized address returned in response to the query continues to be used even after the deletion of the address pair, is avoided. The authorized address that is no longer in use in the network is made available by being immediately deleted from the address pair register table. In this way, the supply of authorized addresses can be used efficiently.

The address reporting system may further comprise: permitted survival period data adding means adding data relating to an permitted survival period to information returned to the second network; and address pair deleting means deleting the address pair that contains the authorized address returned to the second network from the address pair register table, wherein the permitted survival period is set such that it matches a registration period during which the address pair can remain registered in the address pair register table, and is in inverse proportion to the number of addresses pairs registered in the address pair register table. According to this aspect of the present invention, the permitted survival period of the authorized address is set to match the registration period of the address pair and is in inverse proportion to the number of address pairs registered in the address pair register table. Therefore, a given authorized address forming the address pair can be used repeatedly over an extensive period of time when there are a large number of authorized addresses available. This arrangement also ensures that authorized addresses are not depleted even when the number of available authorized addresses becomes small. In this way, it is possible to use a limited supply of authorized addresses efficiently.

BRIEF DESCRIPTION OF THE DRAWINGS

Other objects and further features of the present invention will be apparent from the following detailed description when read in conjunction with the accompanying drawings, in which:

FIG. 6 shows an address pair register table according to the embodiment of FIG. 2;

FIG. 7 shows a first example of an address mapping table according to the embodiment of FIG. 2;

FIG. 9 shows another example of the address mapping table;

DESCRIPTION OF THE PREFERRED EMBODIMENTS

Figure 2:
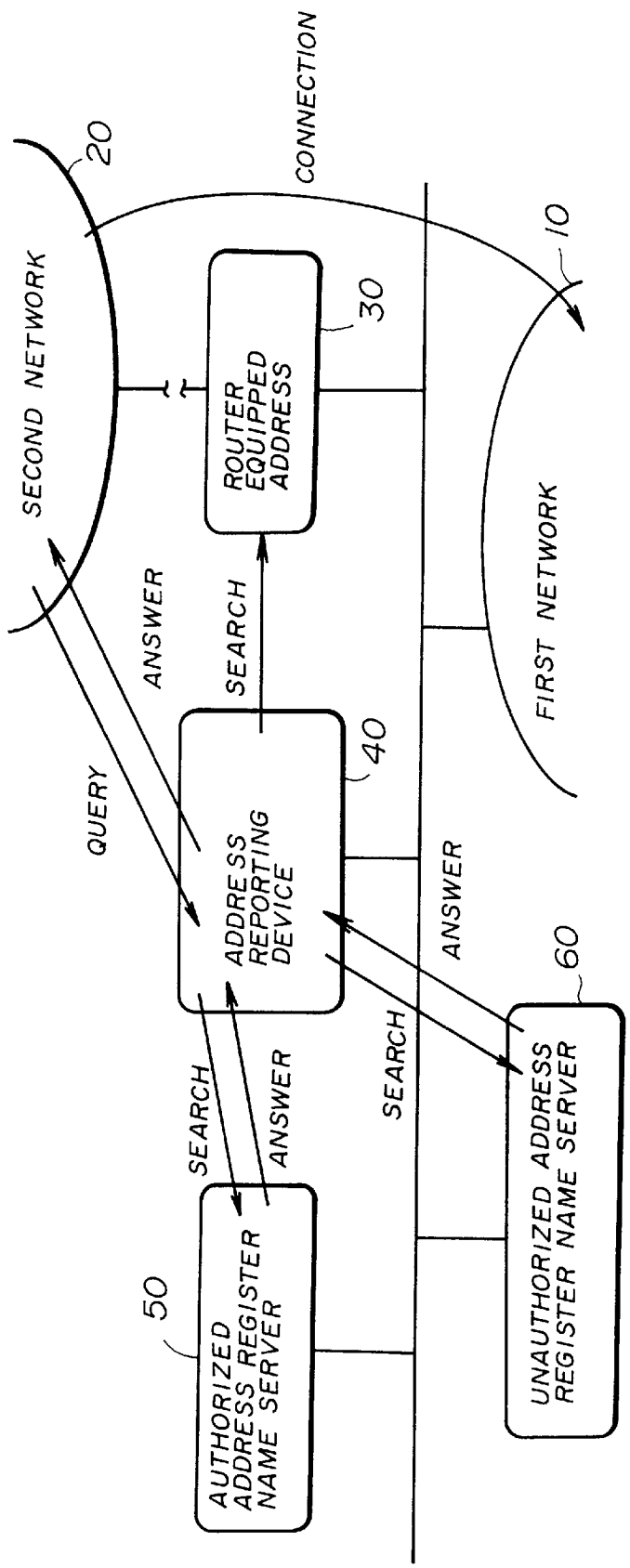
FIG. 2 shows a schematic network construction according to an embodiment of the present invention.

FIG. 2 shows a schematic network construction according to an embodiment of the present invention.

Referring to FIG. 2, a first network 10 is communicable with a second network 20 via the IP network. A plurality of hosts having authorized addresses and a plurality of hosts having unauthorized addresses are connected to the first network 10. The second network 20 in this embodiment may be any network connected to the IP network. A router 30 equipped with an address translation function, an address reporting device 40, an authorized address register name server 50 and an unauthorized address register name server 60 are provided on the IP network.

The router 30 equipped with an address translation function is embodied by a dedicated router or a workstation. The router 30 is equipped with a normal router function. That is, the router 30 is capable of delivering IP packets it receives to a network, deciding on which route to take in the delivery of IP packets and of restricting traffic of packets by authorizing a source address and/or a destination address. The router 30 also stores an address pair register table and an address mapping table so that it is capable of subjecting a source address or a destination address of IP packets to translation according to the address pair register table.

The authorized address register name server 50 is embodied by a storage device that stores host names and addresses of hosts having authorized addresses in the first network 10. The unauthorized address register name server 60 is embodied by a storage device that stores host names and addresses of hosts having unauthorized addresses on the first network 10. In this embodiment, the name servers are embodied by storage devices that is only capable of storing addresses. However, the name servers may be embodied by computers having the storage devices. In this case, a request for retrieval of an address that corresponds to a host name is sent to the computer, which then submits a retrieval result.

Figure 1:
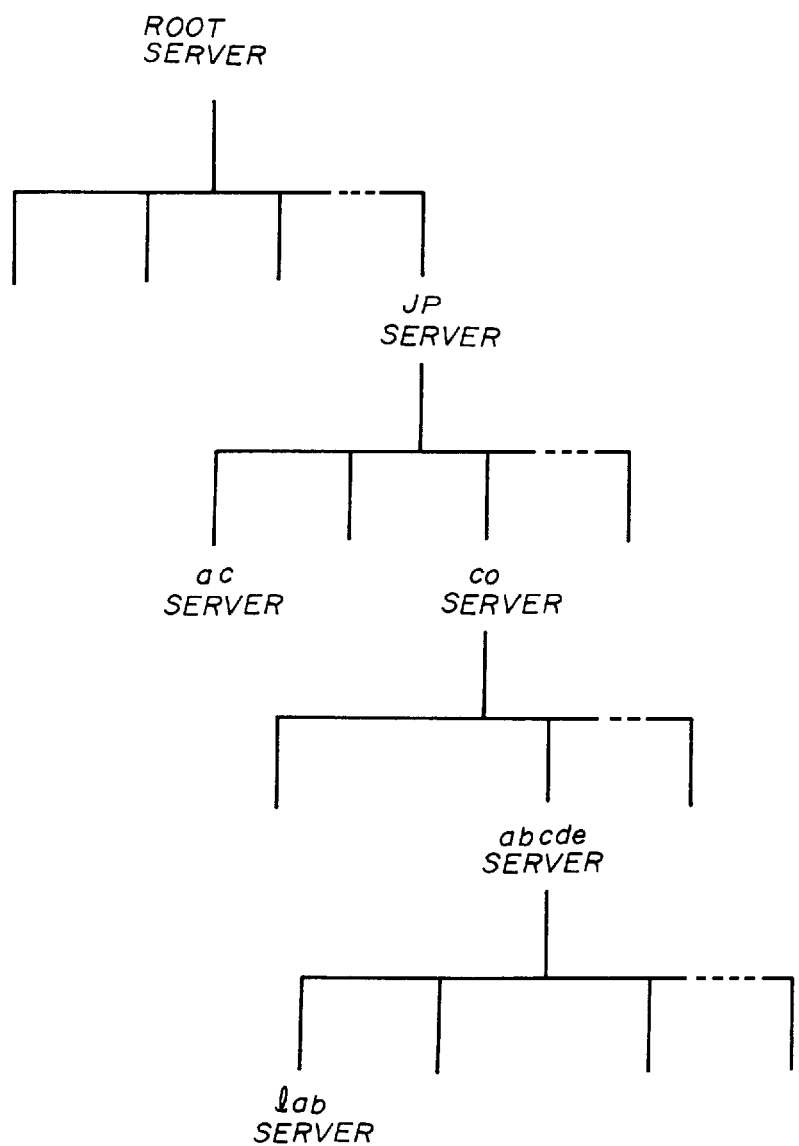
FIG. 1 shows a conceptual tree that explain conventional name servers.

The address reporting device 40 is embodied by a machine for executing programs relating to reporting of addresses. When a query for an address of a host name assigned to a host on the first network is issued from the second network, the address reporting device 40 searches the authorized address register name server 50 and the unauthorized address register name server 60 for the relevant address. If necessary, the address reporting device 40 searches the address pair register table and the address mapping table in the router 30 equipped with an address translation function and returns a relevant authorized address to the second network. If the search fails, the address reporting device 40 notifies the second network that the address requested cannot be found. The query from the second network for an address of a host reaches the address reporting device 40 according to the conceptual tree of name servers shown in FIG. 1.

Referring to FIG. 2, the address reporting device 40 is shown to belong to neither the first network 10 nor the second network 20. The address reporting device 40 is located to serve the first network 10 at a position external to the other networks, using the router. The address reporting device serving the other networks are also located inside a bound marked off by the router.

Figure 3:
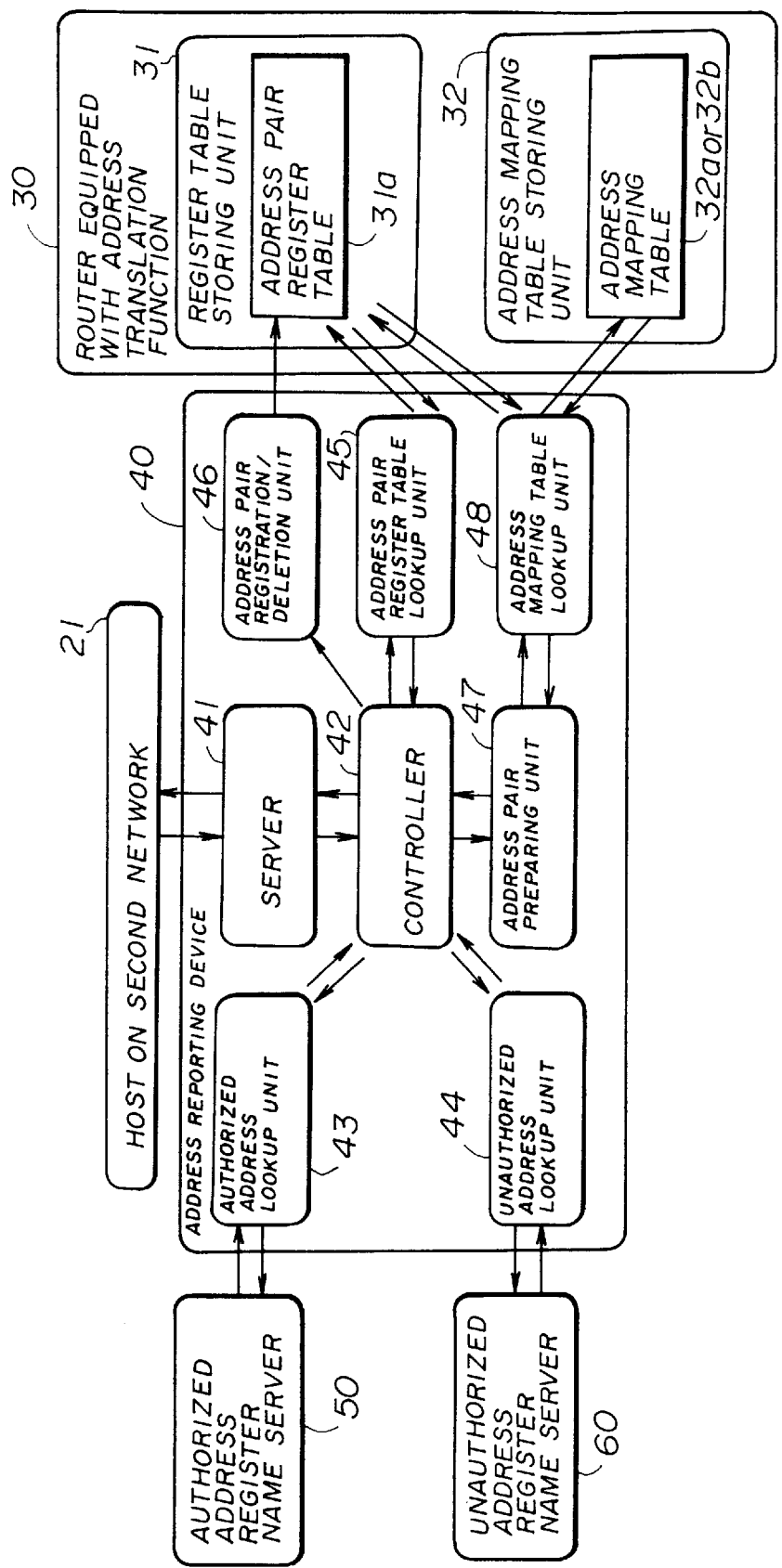
FIG. 3 shows a detailed construction of an address reporting apparatus according to the embodiment of FIG. 2.

FIG. 3 shows a detailed construction of the address reporting device 40 described above. The address reporting device 40 comprises a server 41, a controller 42, an authorized address lookup unit 43, an unauthorized address lookup unit 44, an address pair register table lookup unit 45, an address pair registration/deletion unit 46, an address pair preparing unit 47 and an address mapping table lookup unit 48.

Upon receipt of a query for an address corresponding to a host name (for example, a query from a host 21 shown in FIG. 3 on the second network 20), the server 41 sends the designated host name to the controller 42. According to an instruction from the controller 42, the server 41 returns a requested authorized address or a notification that the address corresponding to the designated host name does not exist, to the source of the query, that is, to the host 21 on the second network 20.

The controller 42 is responsible for controlling the parts of the address reporting device 40 by supplying an instruction to each of the server 41, the authorized address lookup unit 43, the unauthorized address lookup unit 44, the address pair register table lookup unit 45, the address pair registration/deletion unit 46 and the address preparing unit 47. The controller 42 also obtains necessary information from the parts.

In response to an instruction for a search from the controller 42, the authorized address lookup unit 43 accesses the authorized address register name server 50 so as to retrieve an authorized address corresponding to the designated host name that the server 41 received. The authorized address look-up unit 43 returns a retrieval result to the controller 42.

In response to an instruction for a search from the controller 42, the unauthorized address lookup unit 44 accesses the unauthorized address register name server 60 so as to retrieve an authorized address corresponding to the designated host name that the server 41 received. The unauthorized address lookup unit 44 returns a retrieval result to the controller 42.

In response to an instruction for a search from the controller 42, the address pair register table lookup unit 45 searches an address pair register table 31a in the router 30 for an address pair that contains an unauthorized address obtained by the unauthorized address lookup unit 44. The address pair register table lookup unit 45 returns a retrieval result to the controller 42.

In response to a registration instruction from the controller 42, the address pair registration/deletion unit 46 registers a pair consisting of an unauthorized address and an authorized address in the address pair register table 31a provided in the router 30. A deletion instruction from the controller 42 causes the address pair registration/deletion unit 46 to delete an address pair from the address pair register table 31a.

In response to a preparation instruction from the controller 42, the address pair preparing unit 47 prepares an address pair consisting of an unauthorized address and an authorized address in accordance with the retrieval result submitted by the address mapping table lookup unit 48 described below. The address pair preparing unit 47 returns the result to the controller 42.

In response to an instruction from the address pair preparing unit 47, the address mapping table lookup unit 48 searches an address mapping table 32a or 32b in the router 30 for an authorized address that corresponds to the unauthorized address retrieved by the unauthorized address lookup unit 44. The search result is reported to the address pair preparing unit 47.

As shown in FIG. 3, the address pair register table 31a is stored in a register table storing unit 31 embodied by a write-enabled storage device provided in the router 30. The address mapping table 32a or 32b is stored in an address mapping table storing unit 32 also embodied by a write-enabled storage device provided in the router 30.

Figure 4A:
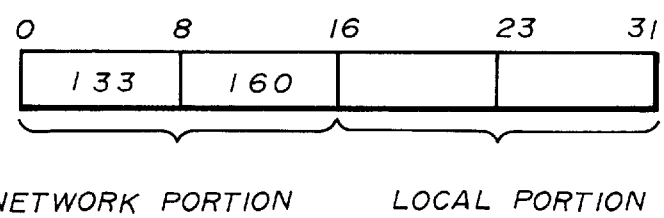
FIG. 4A shows an authorized address.
Figure 4B:
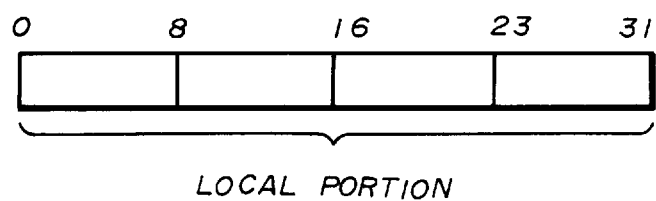
FIG. 4B shows an unauthorized address.

FIG. 4A shows an authorized 32-bit address, and FIG. 4B shows an unauthorized 32-bit address. For example, an authorized class B address allocates first 16 bits (0–15) to the IP network portion and the remaining 16 bits (16–31) to the local portion. Numerals in each portion in FIG. 4A are given as examples. The IP network portion is used to distinguish between networks, and the local portion is used to distinguish between hosts in a given network.

In the case of the class B address as shown in FIG. 4A, the highest-order bit is fixed to "1" and the next bit is fixed to "0". Thus, the remaining 14 bits in the IP network portion enables discrimination between a total of 16,384 (=$2^{14}$)

network addresses. Usually, a dotted decimal notation is used. That is, an IP address is written as four decimal integers separated by decimal points, each integer giving the value of the associated eight bits of the IP address. According to this notation, the class B network address ranges between 128.0 to 191.255. Since the network addresses 128.0 and 191.255 are reserved, the number of available network addresses is 16,384−2=16,382. In the following description, an exemplary network address 133.160 shown in FIG. 4A is used.

Since the local portion consists of 16 bits, discrimination between a total of 65,536 (=$2^{16}$) hosts is enabled. This means that for one class B network address a total of 65,536 hosts addresses are assignable. Several high-order bits in the local portion may be used to indicate a subnetwork. For example, a total of 253 subnetworks may be identified and a total of 253 hosts may be allocated to each subnetwork. In contrast to the authorized address, the unauthorized address as shown in FIG. 4B can be used flexibly as long as the officially assigned IP address is not specified. Using the unauthorized address, it is possible to distinguish between a satisfactorily large number of hosts for one network.

Figure 5:
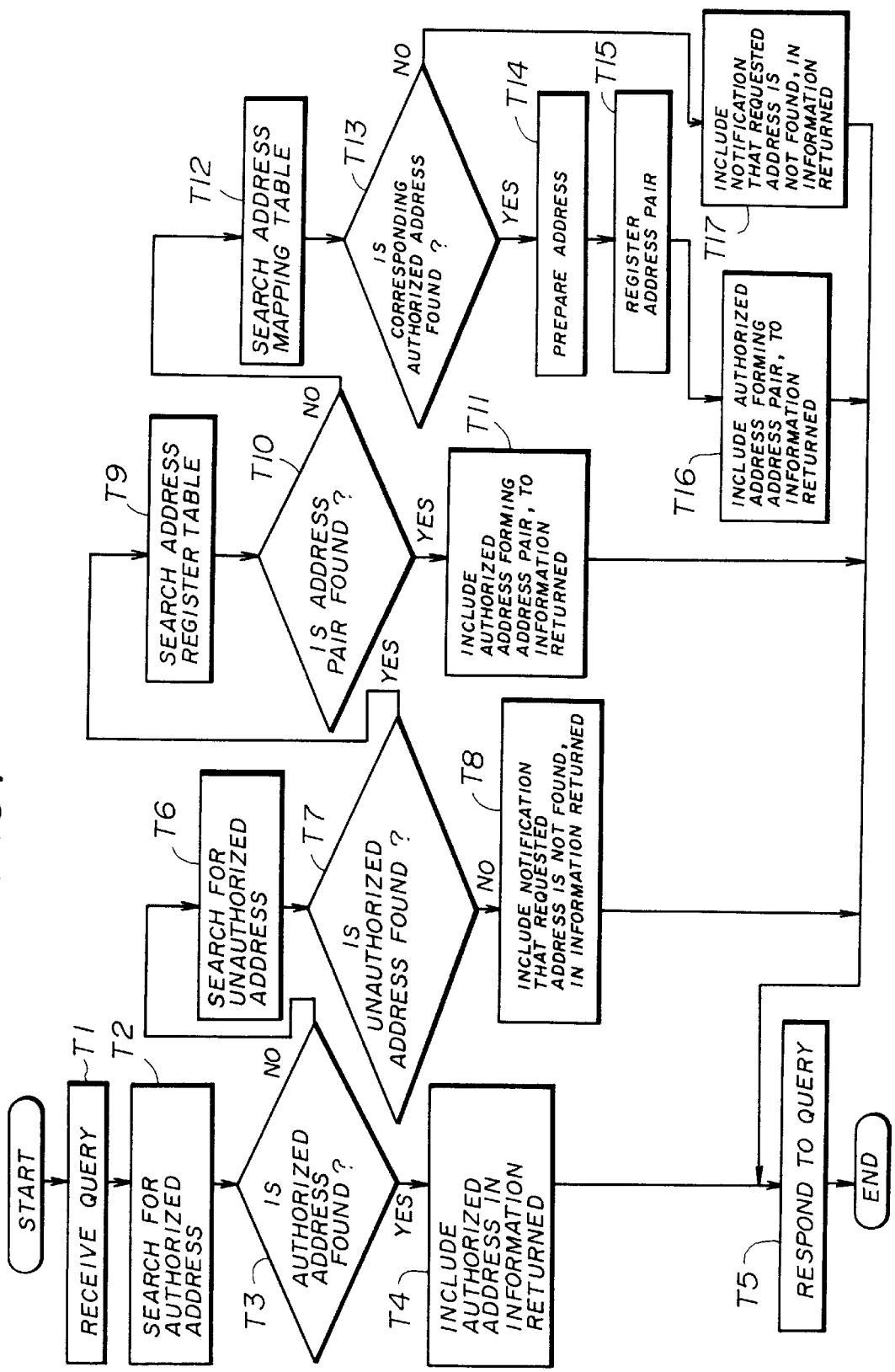
FIG. 5 is a flowchart showing address reporting procedure according to the embodiment of FIG. 2.

A description will now be given, with reference to the flowchart of FIG. 5, of an address reporting procedure executed in the address reporting device 40. In the procedure of FIG. 5, it is assumed that the address pair register table 31a shown in FIG. 6 and the address mapping table 32a shown in FIG. 7 are used. Symbols T1 through T7 in FIG. 5 indicate steps in the flow.

In step T1, the server 41 receives a query from the host 21 on the second network 20 for an address corresponding to a host name. In step T2, the controller 42 instructs the authorized address lookup unit 43 to retrieve an authorized address that corresponds to the designated host name. In response to the instruction, the authorized address lookup unit 43 accesses the authorized address register name server 50 so as to retrieve an authorized address that corresponds to the designated host name. The authorized address lookup unit 43 reports a retrieval result to the controller 42.

In step T3, the retrieval result is assessed by the controller 42. If the controller 42 decides that the address corresponding to the designated host name is registered as an authorized address in the authorized address register name server 50, the control is turned over to step T4, wherein the controller 42 instructs the server 41 to return the authorized address retrieved by the authorized address register name server 50. In accordance with this instruction, the server 41 supplies a response to the host 21 on the second network 20. In this embodiment, use of the same authorized address in two communication sessions is avoided by not allowing the authorized address registered in the authorized address register name server 50 to be registered in the address mapping table 32a.

If it is determined in step T3 that the authorized address register name server 50 does not store an address corresponding to the designated host name, the control is turned over to step T6. The controller 42 instructs the unauthorized address lookup unit 44 to retrieve an unauthorized address that corresponds to the designated host name. In response to this instruction, the unauthorized address lookup unit 44 accesses the unauthorized address register name server 60 to retrieve an unauthorized address that corresponds to the designated host name. The unauthorized address lookup unit 44 reports a retrieval result to the controller 42.

In step T7, the retrieval result is assessed by the controller 42. If the controller 42 decides that the unauthorized address register name server 60 does not store an address corresponding to the designated host name, the control is turned over to step T8. The controller 42 instructs the server 41 to report that there is no address that corresponds to the designated host name. In accordance with this instruction, the server 41 returns this report to the host 21 on the second network 20.

If it is determined in step T7 that the unauthorized address register name server 60 stores an unauthorized address that corresponds to the designated host name, the control is turned over to step T9, wherein the controller 42 instructs the address pair register table lookup unit 45 to search the address pair register table in the router 30 for an address pair that includes the unauthorized address retrieved from the unauthorized address register name server 60. In accordance with the instruction from the controller 42, the address pair register table lookup unit 45 retrieves the address pair that includes the unauthorized address retrieved from the unauthorized address register name server 60 and reports a retrieval result to the controller 42.

In step T10, the retrieval result is assessed by the controller 42. If the controller 42 decides that the address pair register table 31a stores an address pair that includes the unauthorized address retrieved from the unauthorized address register name server 60, the control is turned over to step T11, wherein the controller 42 instructs the server 41 to respond to the query with the authorized address included in the address pair retrieved. The control is then returned to step T5.

The address pair register table 31a searched in step T9 is shown in FIG. 6. In the address pair register table 31a shown in FIG. 6 are registered three address pairs, namely a pair formed by 10.0.0.1 (unauthorized address) and 133.160.29.1 (authorized address), a pair formed by 10.0.0.2 (unauthorized address) and 133.160.29.2 (authorized address) and a pair formed by 10.10.0.1 (unauthorized address) and 133.160.30.1 (authorized address).

Assuming that the unauthorized address retrieved from the unauthorized address register name server 60 is 10.0.0.2, which is included in the second address pair in the address pair register table 31a shown in FIG. 6, the authorized address 133.060.29.2 included in the second address pair is returned as the requested authorized address.

If it is determined as a result of the retrieval assessment by the controller 42 in step T10 that the address pair that includes the unauthorized address retrieved from the unauthorized address register name server 60 is not registered in the address pair register table 31a, the control is turned over to step T12. In step T12, the controller 42 instructs the address pair preparing unit 47 to prepare an address pair formed by the unauthorized address retrieved from the unauthorized address register name server 60 and an authorized address. The address pair preparing unit 47 requests the address mapping table lookup unit 48 to retrieve an authorized address that forms the address pair with the unauthorized address retrieved from the unauthorized address register name server 60. Upon requested by the address pair preparing unit 47, the address mapping table lookup unit 48 retrieves the authorized address that forms the pair and reports the retrieval result to the address pair preparing unit 47.

In step T13, the retrieval result submitted by the address mapping table lookup unit 48 is assessed. If it is determined that there is an authorized address that corresponds to the unauthorized address retrieved from the unauthorized address register name server 60, the control is turned over to step T14. In step T14, the address preparing unit 47 prepares an address pair formed by the unauthorized address retrieved from the unauthorized address register name server 60 and the authorized address retrieved, and submits the formed pair to the controller 42. An example of the address mapping table 32a is shown in FIG. 7. It will be noted that the address mapping table 32a shown in FIG. 7 has a format similar to the address pair register table 31a shown in FIG. 6. Address pairs each formed by one unauthorized address and one authorized address are stored in the address mapping table 32a.

By using the address mapping table 32a, it is possible to retrieve an authorized address that corresponds to a given unauthorized address. For example, if the unauthorized address retrieved from the unauthorized address register name server 60 matches 10.0.0.3 in the third entry in the table of FIG. 7, the associated authorized addresses 133.160.29.3 is selected so that a pair formed by these two addresses are prepared.

In step T15, the controller instructs the address pair registration/deletion unit 46 to register the address pair received from the address pair preparing unit 47. In response to the instruction from the controller 42, the address pair registration/deletion unit 46 registers the address pair in the address pair register table 31a. In step T16, the controller 42 instructs the server 41 to respond to the query with the authorized address in the address pair prepared by the address pair preparing unit 47. The control is then returned to step T5.

If it is found in step T13 that there is no authorized address that corresponds to the unauthorized address retrieved from the unauthorized address register name server 60, that is, if the retrieved unauthorized address is not registered in the address mapping table 32a, or if the authorized address forming the pair with the unauthorized address registered in the address mapping table 32a is used in another communication session, the control is turned over to step T17. In step T17, the controller 42 instructs the server 41 to respond to the query by reporting that there is no address that corresponds to the designated host name. The control is then returned to step T5. An alternative step following a determination in step T13 that the retrieved unauthorized address is not registered in the address mapping table 32a is to cause an authorized address not registered in the authorized address register name server 50 as well as in the address mapping table 32a to form a pair with the retrieved unauthorized address, so that the resultant pair is registered in the address mapping table 32a.

Figure 8:
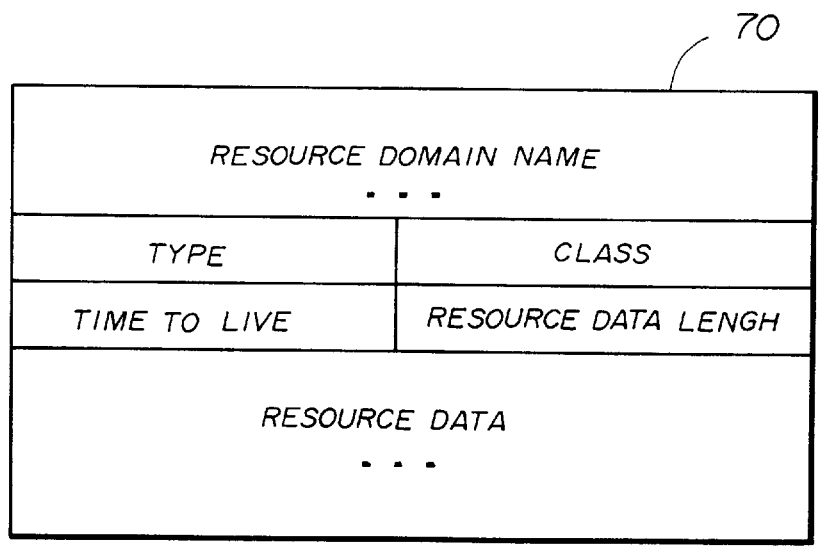
FIG. 8 shows a format of information returned in reply to a query.

FIG. 8 shows an example of a format of a resource record included in a response supplied by the server 41 to the host 21 on the second network 20 in step T5. Referring to FIG. 8, the RESOURCE DOMAIN NAME field contains the host name designated in the query. The TYPE field contains a code indicating the type of data included in the resource record. If an address is to be returned, the code "A" is entered in this field. The CLASS field contains a code indicating a protocol family. The TIME TO LIVE (TTL) field gives permitted survival time for data. The RESOURCE DATA LENGTH field specifies the count of octets in the RESOURCE DATA field. If the code "A" is entered in the TYPE field, an IP address that corresponds to the designated host name is entered in the RESOURCE DATA field.

In order to prevent a limited supply of authorized addresses from being exhausted, the address pair registered in the address pair is deleted by the address pair registration/deletion unit 46 when a period of time during which the address pair may remain registered (hereinafter, referred to as a registration period) has expired. An entry in the TIME TO LIVE field is set in such a manner that it is related to the registration period. For example, TIME TO LIVE is set such that it expires before the address pair including the authorized address returned in response to the query is deleted.

Alternatively, TIME TO LIVE may be set so as to be equal to the registration period. This setting may be supplemented by an additional setting in which TTL and the registration period are longer as the number of address pairs registered in the address pair register table decreases and shorter as the number of address pairs registered in the address pair register table increases. For example, the registration period may be set to one hour until half of the authorized addresses are registered in the address pair register table; half an hour if more than half are registered; and a quarter of an hour if ¾ of the authorized addresses are registered.

While the address mapping table 32a shown in FIG. 7 is configured such that one unauthorized address forms a pair with one authorized address, an address mapping table as shown in FIG. 9 may be used. In the address mapping table 32b shown in FIG. 9, a plurality of unauthorized addresses (hereinafter, referred to as an unauthorized address group) is made to correspond to one authorized address or a plurality of authorized addresses (hereinafter, referred to as an authorized address group).

In the row (a) of the address mapping table 32b, one unauthorized address is specified in the unauthorized address field and one authorized address is specified in the authorized address field. The addresses are bound to each other in the same manner as in the address mapping table 32a of FIG. 7.

In the row (b) of the address mapping table 32b, an unauthorized address group is specified in the unauthorized address field and an authorized address is specified in the authorized address field. In this particular section of the address mapping table, one authorized address (133.160.29.2) is selected to form a pair with an unauthorized address belonging to a specific range (10.0.0.2–128).

In the rows (c) through (1), the unauthorized address group is specified in the unauthorized address field and the authorized address group is specified in the authorized address field. Address translation in the row (c) is such that an authorized address selected from a specific range (133.160.29.3–15) is made to form a pair with an unauthorized address belonging to a specific range (10.0.0.129–254).

In the row (d), the last eight bits of the unauthorized address group notation are represented as "n", and the last eight bits of the authorized address group notation are also represented as "n". In this case, an authorized address whose last eight bits match the last eight bits of the unauthorized address is selected as the authorized address forming the address pair.

In the row (e), the number of unauthorized addresses forming the unauthorized address group is equal to the number of authorized addresses forming the authorized address group. Further, the third eight bits of the unauthorized address in the unauthorized address group may have a value that varies over the same range (1–10) as the last eight bits of the authorized address in the authorized address group. In this case, an authorized address whose last eight bits match the third eight bits of the unauthorized address is selected as the authorized address that forms the address pair.

In the row (f), the third eight bits are represented as "n" in the unauthorized address group notation, and the last eight bits of the authorized address in the authorized address group are represented as "n". In this case, an authorized address whose last eight bits match the third eight bits of the unauthorized address in the unauthorized address group is selected as the authorized address that forms the address pair.

In the rows (g) through (l), selected group(s) of eight bits from among the second through fourth eight-bit groups is(are) represented as "*" in the unauthorized address group notation, where * means an arbitrary value within the range between 1 and 254. It will also be noted in the rows (j) through (l) that the last eight bits of the authorized address group notation are represented as "*", where * means an arbitrary value within the range between 1 and 254. In the rows (g) through (l), an authorized address whose last eight bits match the corresponding eight bits of the unauthorized address is selected as the address that forms the address pair. In the rows (i) through (l), an authorized address is selected from the authorized address group in accordance with a predetermined criteria. For example, the lowest authorized address available in the authorized address group may be selected as the address that forms the address pair.

The address mapping table as shown in FIG. 9 should be configured so as to adapt to the construction of individual networks. For example, assuming that the first 24 bits in the unauthorized address denotes the network address, one of ten authorized addresses ranging from 133.160.29.1 to 133.160.29.10 may be allocated to any host having the network address ranging from 10.0.1 to 10.0.10 (see the row (g) in FIG. 9).

Figure 10:
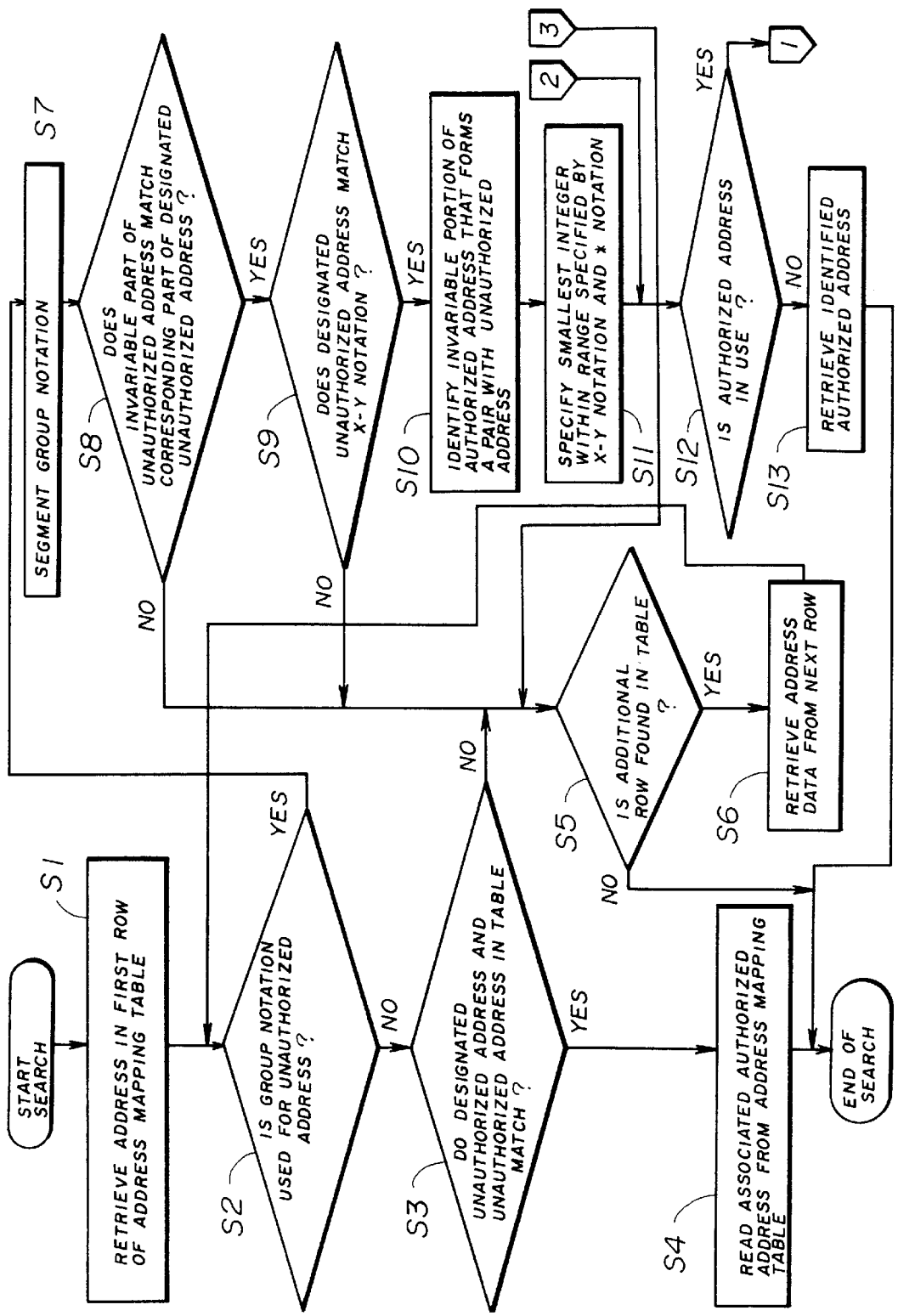
FIG. 10 is a flowchart of a part of a procedure for retrieving an authorized address from the address mapping table of FIG. 9.

A description will now be given, with reference to flowcharts of FIGS. 10 and 11, of how an authorized address is retrieved from the address mapping table 32b. Symbols S1 – S20 in FIGS. 10 and 11 indicate steps in the flow.

The address mapping table lookup unit 48 starts a search in step S1 by accessing the first row of the address mapping table and retrieving address data therein. In step S2, a determination is made as to whether or not an address group notation is used, that is, whether or not an unauthorized address group is entered in the accessed row of the address mapping table. If a negative answer is yielded in step S2, the control is turned over to step S3. If an address group notation is used, the control is turned over to step S7.

In step S3, a determination is made as to whether or not the unauthorized address retrieved from the unauthorized address register name server 60 matches the unauthorized address specification in the address mapping table. If the address retrieved matches the address specification in the address mapping table, the control is returned to step S4, wherein the authorized address in the accessed row of the address mapping table is reported to the address pair preparing unit 47 via the address mapping table lookup unit 48. The address pair preparing unit 47 then prepares an address pair formed by the reported authorized address and the unauthorized address retrieved from the unauthorized address register name server 60.

If it is determined in step S3 that the designated unauthorized address and the unauthorized address in the accessed row do not match, the control is turned over to step S5, wherein a determination is made as to whether or not an additional row is available in the address mapping table. If it is determined that there is an additional row to be accessed in the address mapping table, the control is turned over to step S6, wherein address data is retrieved from the next row.

Thereupon, the control is returned to step S2. If it is determined in step S5 that no additional row is available in the address mapping table, the search ends.

If it is determined in step S2 that an unauthorized address group is specified in the accessed row, the control is turned over to step S7, wherein the unauthorized address group notation is segmented. For example, dotted decimal notation of the unauthorized address group 10.0.20.2–128 is segmented into "10", "0", "20" and "2–128". Next, in step S8, a determination is made as to whether or not the invariable eight-bit groups "10", "0" and "20" match the corresponding eight-bit groups in the unauthorized address retrieved from the unauthorized address register name server 60. If the eight-bit groups do not match, the control is returned to step S5, whereupon the above process is repeated.

If it is determined in step S8 that the invariable eight-bit groups match the corresponding eight-bit groups of the unauthorized address retrieved from the unauthorized address register name server 60, the control is turned over to step S9, wherein a determination is made as to whether or not the retrieved unauthorized address matches the flexible notation for eight-bits in the form of X–Y (for example, the notation 1–10 that appears in FIG. 9), where X and Y are decimal integers. If it is determined in step S9 that the retrieved unauthorized address does not find itself within the range specified by the flexible X–Y notation, the control is returned to step S5. If it is determined that the unauthorized address matches the flexible X–Y notation, the control is turned over to step S10. In step S10, the non-flexible portion of the authorized address that forms a pair with the unauthorized address is identified.

In step S1, the smallest integer within the range specified by the flexible X–Y notation of the authorized address is specified for the corresponding integer constituting the unauthorized address. Also, the smallest integer within the range specified by the * notation of the authorized address is specified for the corresponding integer constituting the unauthorized address. The control is then turned over to step S12. In S12, a determination is made as to whether or not the authorized address identified is in use. If it is determined in step S12 that the identified authorized address is not in use, that is, the identified address is not registered in the address pair register table 31a, the control is turned over to step S13, wherein the identified authorized address is retrieved. This completes the requested search.

Figure 11:
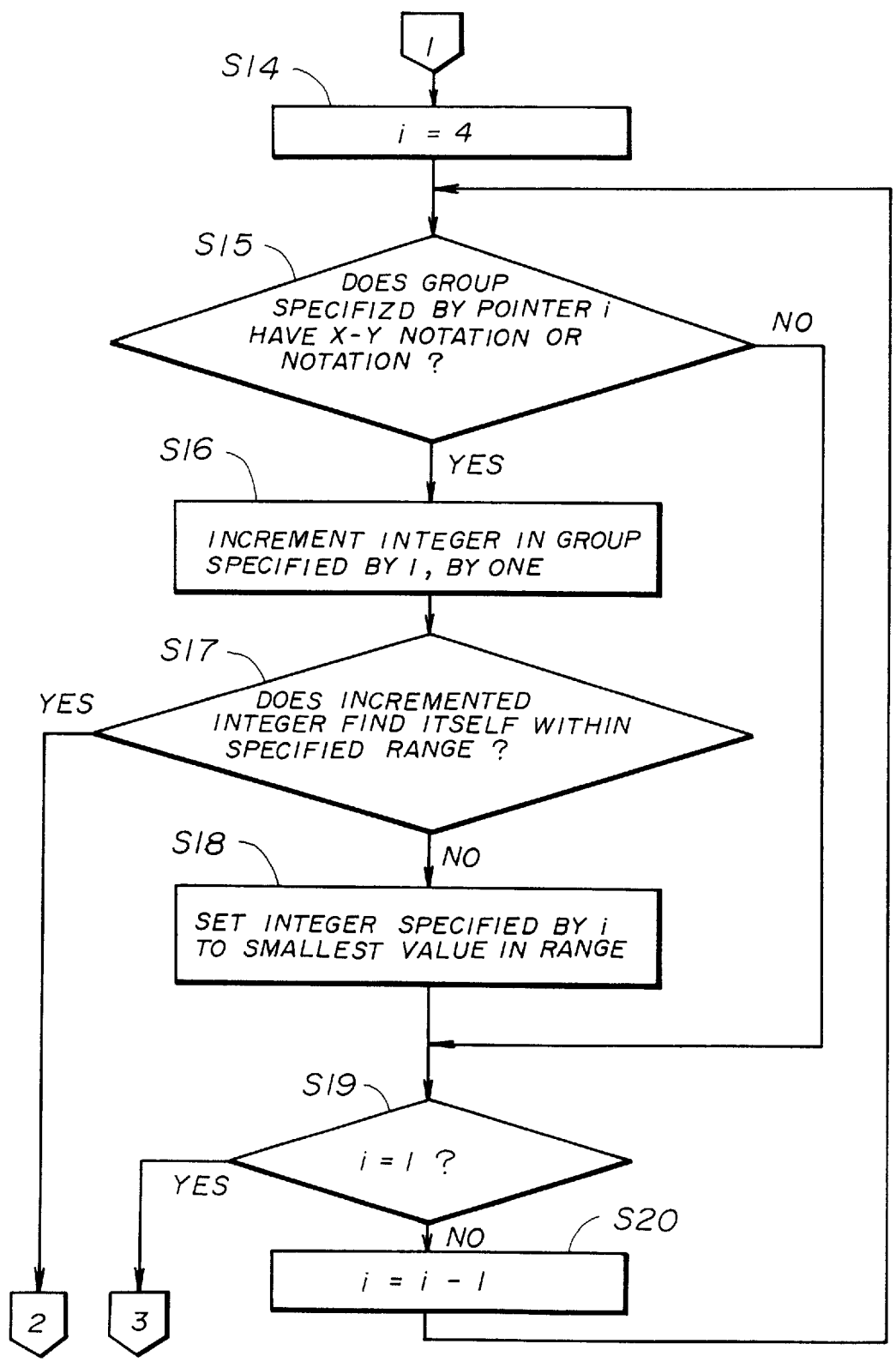
FIG. 11 is a flowchart showing another part of a procedure for retrieving an authorized address.

If it is determined in step S12 that the identified address is in use, the control is turned over to step S14 shown in FIG. 11. In step S14, i=4 is specified initially, where i is a pointer for specifying one of the decimal groups constituting the authorized address and separated by the dots. In case of the authorized address 133.160.33–34.* found in the address mapping table of FIG. 9, i=1 specifies 133, i=2 specifies 160, i=3 specifies 33–34 (X–Y notation) and i=4 specifies *.

In step S15, a determination is made as to whether the decimal group specified by the pointer i has the X–Y notation or the * notation. If it is determined that the decimal group has the X–Y notation or the * notation, the control is turned over to step S16. If an negative answer is yielded in step S15, the control is turned over to step S19. In step S16, the integer in the decimal group is incremented by 1. In step S17, a determination is made as to whether or not the incremented integer finds itself within the specified range.

If it is determined in S17 that the incremented integer finds itself within the specified range, the control is turned over to S12. If a negative answer is yielded in S17, the control is turned over to step S18, wherein the integer specified by the pointer i is set to the smallest value within the range. In step S19, a determination is made as to whether or not i=1 holds. If i=1, the control is returned to S5. If i=1 does not hold, the control is turned over to step S20, wherein i is decremented by 1. The control is turned over to S15.

The above-described steps are repeated until the authorized address that is not in use can be identified.

Figure 12:
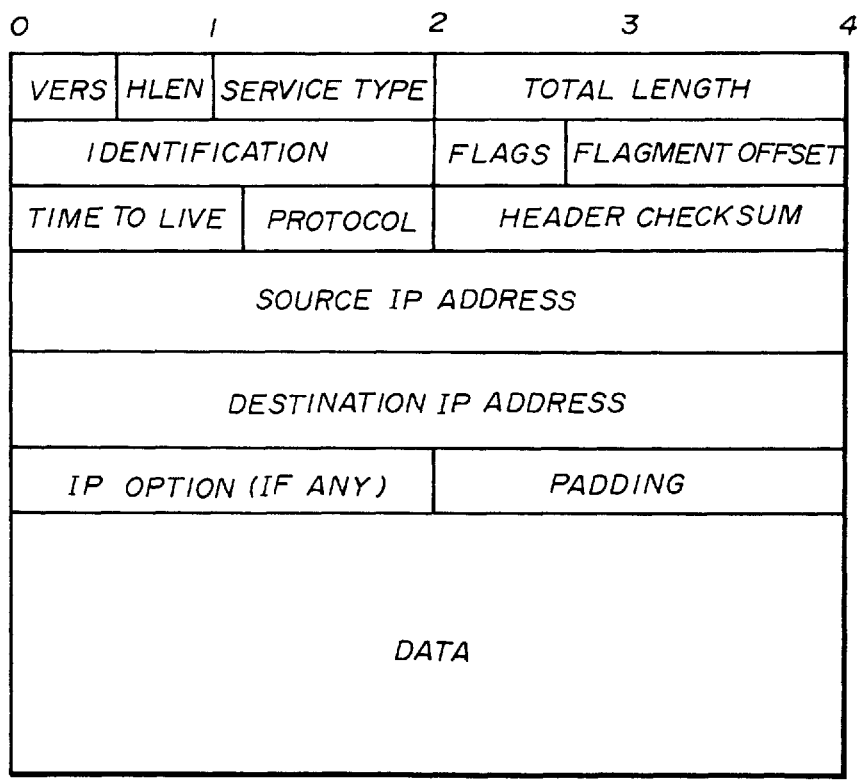
FIG. 12 shows an example of a format of an IP packet according to the embodiment of FIG. 2.

FIG. 12 shows an example of a format of an IP packet according to the embodiment of FIG. 2. As shown in FIG. 12, four bytes starting at the thirteenth byte are reserved for a source IP address, and the next four bytes are reserved for a destination address. An IP packet is delivered to the destination via a router on the network. A route chosen to send packets is determined according to a routing table stored in the router. Configuration of the routing table differs from one routing scheme to another. A description will now be given of a table used in hop-by-hop routing.

Figures 13A, 13B:
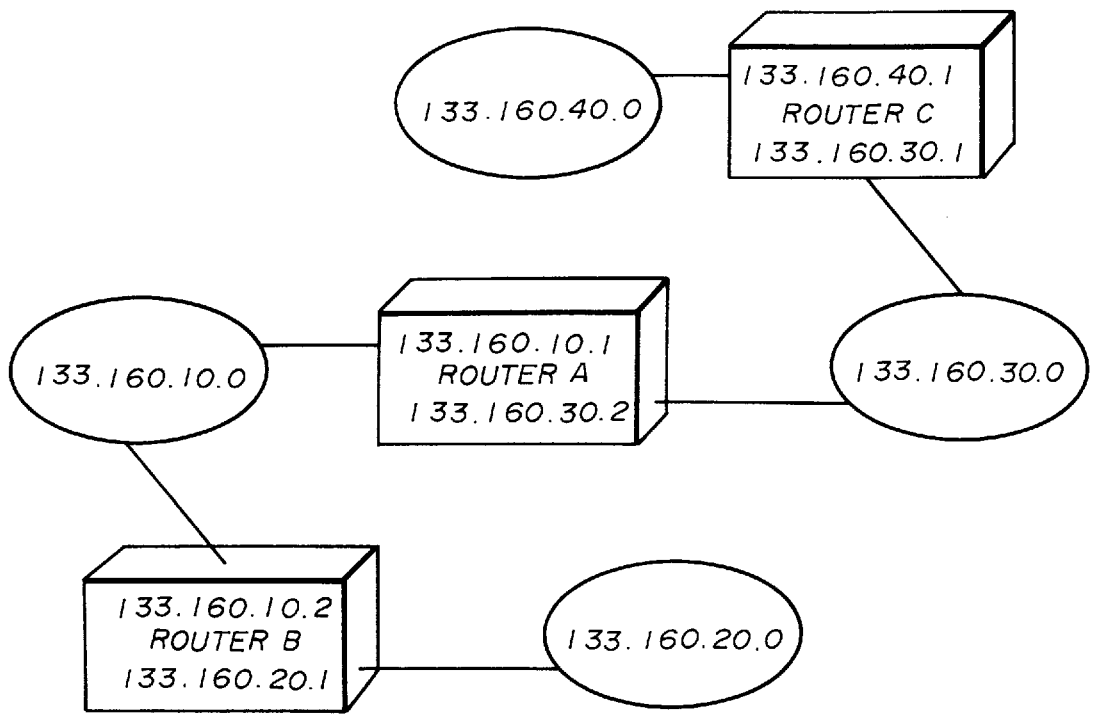
FIG. 13A shows a construction of a network in which a routing scheme according to the embodiment of FIG. 2 is employed.
FIG. 13B shows a routing table employed in the routing scheme according to the embodiment of FIG. 2.

It is assumed that the router A in the network construction shown in FIG. 13A stores a routing table shown in FIG. 13B. Each of the routers shown in FIG. 13B has as many addresses as the networks (interfaces) connected thereto. Pairs formed by a destination address and an address of a next hop along the path to the destination network specified are in the routing table of FIG. 13B. The destination address may be an address of a multi-purpose host. However, it is assumed, in this embodiment, that a target local network address is entered as the destination address. A next hop refers to a router to which IP packets is sent next before they reach the destination address. If the target local network is connected directly to the router, the address of the router itself is entered in the next hop section. That is, the local network having the address 133.160.10.0 and the local network having the address 133.160.30.0 are capable of sending packets without using the router A. Upon receipt of an IP packet, the router A refers to the routing table shown in FIG. 13B. If the IP packet has as its destination a host on a local network having the address 133.160.40.0, the router A forwards the IP packet to the router C (133.160.30.1). The router C also stores a similar routing table. By referring to this table, the router C forwards the packet to the local network having the address 133.160.40.0. In this way, IP packets travel across intermediate routers before reaching the destination host.

The router 30 also stores a similar routing table which it uses in routing. In this embodiment, the router 30 also performs address translation described below.

Assuming that the router 30 responds to a query from the host 21 on the second network 20 with an authorized address and that an IP packet having as its destination address the reported authorized address is sent from the host 21 on the second network 20 to the router 30, the router 30 refers to the address pair register table so as to translate an authorized address found in the received packet to an unauthorized address that forms a pair with the authorized address. The router 30 then sends the packet to the first network 10. As a result of this, the IP packet originating from the host 21 on the second network 20 is delivered to the host having the unauthorized address on the first network 10.

When the host having the unauthorized address on the first network sends an IP packet containing the unauthorized address in its source address field to the host 21 on the second network 20, the recipient router 30 refers to the address pair register table so as to translate the unauthorized source address to the authorized address that forms a pair with the unauthorized address. The resultant IP packet is sent to the second network 20.

To summarize the above, the host 21 on the second network 20 is able to send an IP packet to the host having an unauthorized address on the first network 10, without recognizing that the recipient has an unauthorized address instead of the authorized address. Correspondingly, the host having the unauthorized address on the first network 10 is able to send an IP packet to the host 21 on the second network 20 despite that the fact that its own address is unauthorized.

As will be understood from the above description, each of the means described in claim 9 is constructed as follows. Authorized address storing means for storing authorized addresses is embodied by the authorized address register name server 50. Unauthorized address storing means for storing unauthorized address is embodied by the unauthorized address register name server 60. Receiving means for receiving a query for the address from the second network is embodied by the server 41. Address determining means for determining whether the address that corresponds to the host name designated in the query is an authorized address stored in the authorized address storing means or an unauthorized address stored in the unauthorized address means is embodied by the controller 42. Address preparing means for preparing an address pair formed by the unauthorized address and the authorized address when it is determined by the address discriminating means that the address corresponding to the host name designated in the query is embodied by the address preparing unit 47. Address pair registering means for registering the address pair prepared by the address preparing unit 47 in the address pair register table is embodied by the address pair registration/deletion unit 46. Address reporting means for sending an authorized address that forms an address pair to the second network when it is determined by the address determining means that the address corresponding to the host name designated in the query is embodied by the controller 42.

Each of the means as described in claim 10 is constructed as follows. Authorized address storing means for storing a plurality of authorized addresses is embodied by the authorized address register name server 50. Unauthorized address storing means for storing a plurality of unauthorized addresses is embodied by the unauthorized address register name server 60. Receiving means for receiving a query for an address from the second network is embodied by the server 41. Address determining means for determining whether the address corresponding to the host name designated in the query received by the receiving means is one of the plurality of authorized addresses stored in the authorized address storing means or one of the plurality of unauthorized addresses stored in the unauthorized address storing means is embodied by the controller 42. Address pair preparing means for preparing an address pair formed of the unauthorized address and the authorized address when it is determined by the address discriminating means that the address corresponding to the host name designated in the query is one of the plurality of unauthorized addresses is embodied by the address preparing unit 47. Address pair registering means for registering the address pair prepared by the address pair preparing means in the address pair register table is embodied by the address pair registration/deletion unit 46. Address reporting means for sending an authorized address that forms an address pair to the second network when it is determined by the address determining means that the address corresponding to the host name designated in the query is one of the plurality of unauthorized addresses is embodied by the controller 42.

Each of the means described in claim 11 is constructed as follows. Address mapping table reading means for searching, when it is determined by the address determining means that the address corresponding to the host name designated in the query from the second network is one of the plurality of unauthorized addresses, the address mapping table for the authorized address corresponding to the unauthorized address is embodied by the address mapping table lookup unit 48.

Each of the means described in claim 12 is constructed as follows. Registration determining means for determining, when it is determined that the address corresponding to the host name designated in the query is one of the plurality of unauthorized addresses, whether the address pair that contains the unauthorized address corresponding to the host name designated in the query is registered in the address pair register table is embodied by the controller 42. Address pair register table reading means for retrieving, when it is determined by the registration determining means that the address pair that contains the unauthorized address corresponding to the host name designated in the query is registered in the address pair register table, the authorized address that forms the address pair from the address pair register table is embodied by the address pair register table lookup unit 45. Address specifying means for specifying, when it is determined by the registration determining means that the address pair that contains the unauthorized address corresponding to the host name designated in the query is not registered in the address pair register table, one of the plurality of authorized addresses not registered in the address pair register table is embodied by the address mapping table lookup unit 48.

Each of the means described in claims 14 – 16 is constructed as follows. Permitted survival period data adding means for adding data relating to permitted survival period to information returned to the second network is embodied by the controller 42. Address pair deleting means for deleting the address pair that contains the authorized address returned to the second network from the address pair register table when the survival period for the address pair has expired is embodied by the address pair registration/deletion unit 46.

As has been described, this embodiment is configured such that, when an address corresponding to a host name designated in the query from the second network 20 is an unauthorized address, an address pair formed by the authorized address and the unauthorized address is prepared and registered in the address pair register table 31*a*. The query is responded to by the authorized address forming the address pair. The destination address specified in the packet sent from the second network 20 to the host having the unauthorized address on the first network 10 is translated to the unauthorized address by referring to the address pair register table 31*a*. The source address specified in the packet send from the host having the unauthorized address on the first network 10 to the second network 20 is translated to the authorized address by referring to the address pair register table 31*a*.

Thus, according to this embodiment, it is possible to respond to a connection request issued by the host 21 on the second network 20 to the host having the unauthorized address on the first network. Once the connection is established, communication between the two hosts is enabled. In this embodiment, it is assumed that the first network 10 contains a plurality of authorized addresses and a plurality of unauthorized addresses so that it is possible to specify one authorized address that forms the pair, from among the plurality of authorized addresses. In this way, it is possible to properly respond to the query for the address of the host having an unauthorized address with one of the plurality of authorized addresses. Thus, according to this embodiment, limited supply of the plurality of authorized addresses can be efficiently utilized.

If the address pair that contains the unauthorized address corresponding to the host name designated in the query is registered in the address pair register table 31*a*, the authorized address forming the address pair is retrieved from the address pair register table 31*a* and returned to the second network. If the address pair is not registered in the address pair register table 31*a*, one of the plurality of authorized addresses not specified in the address pair register table 31*a* is specified. The address pair formed by the unauthorized address corresponding to the host name designated in the query and the specified authorized address is registered in the address pair register table. The specified authorized address is returned to the second network.

To summarize the above, a query which designates a host name having an unauthorized address that already forms an address pair can be returned with the authorized address forming the address pair. Preparation and registration of an address pair can be omitted. If an address pair that contains the unauthorized address corresponding to the host name designated in the query is not registered in the address pair register table, an authorized address not registered in the address pair register table is specified so that a new address pair is formed. Therefore, simultaneous use of the same authorized address in different communication sessions can be prevented from happening.

When a new address pair is prepared, the authorized address corresponding to the designated unauthorized address is retrieved from the address mapping table 32*a* or 32*b*. An address pair is prepared from the retrieved authorized address and the unauthorized address designated in the query. The authorized address that forms the address pair is returned as a response to the query.

By deleting the address pair that contains the authorized address returned to the second network after the TTL of the information returned to the second network 20 has expired, the pair formed by the authorized address and the unauthorized address can remain registered while the authorized address remain used in the network. In this way, extended use of the authorized address contained in the returned information after the deletion of the address pair can be prevented from happening.

By matching the registration period of the address pair in the address pair register table with the TTL, an inconvenience such as a continued use of the authorized address contained in the returned information even after the deletion of the address pair can be avoided. This arrangement also ensures that the authorized address that is not used in the network any more is immediately deleted from the address pair register table 31*a*, making the authorized address available for another connection. In this way, authorized addresses can be used efficiently.

By matching the TTL and the registration period of the address pair, and setting the TTL and the registration period in inverse proportion to the number of address pairs registered in the address pair register table 31*a*, a given authorized address forming the address pair can be used repeatedly over an extensive period of time when there are a large number of authorized addresses available. This arrangement also ensures that authorized addresses are not depleted even when the number of available authorized addresses becomes small. In this way, it is possible to use a limited supply of authorized addresses efficiently.

By using the address mapping table 32*a* as shown in FIG. 7, wherein the unauthorized address and the authorized address are placed in one-to-one correspondence, it is easy to identify the authorized address to be used. Simultaneous use of the same authorized address in different communication sessions can be avoided.

By using the address mapping table 32*b* as shown in FIG. 9, in which the group notation specifying a group of addresses is used, it is possible to reduce the size of the address mapping table. Further, preparation and modification of the address mapping table 32*b* is easy. The use of the address mapping table 32*b* is especially effective when there are a large number of hosts in the first network 10 and there are a large number of addresses.

While it is assumed in the above-described embodiment that the router 30, the address reporting device 40, the authorized address register name server 50 and the unauthorized address register name server 60 are embodied by independent devices, an alternative construction may be employed. For example, the address reporting device 40 may include data bases for the authorized address register name server 50 and the unauthorized address register name server 60.

The embodiment of the present invention described above is constructed such that the address reporting device 40 searches the address pair register table 31*a* and the address mapping table 32*a* or 32*b* stored in the router 30, it is also possible for the address reporting device 40 to import the address pair register table and the address mapping table from the router 30 on a regular basis and searches the imported tables. The address reporting device 40 and the router 30 are provided separately in the above-described embodiment. However, all or part of the functions of the address reporting device 40 may be included in the router 30.

The present invention is not limited to the above described embodiment and variations, and further variations and modifications may be made without departing from the scope of the present invention.

What is claimed is:

1. An address reporting method for returning, when a query requesting an address corresponding to a machine name of a machine on a first network provided with an authorized address and an unauthorized address is issued from a second network, the requested address to the second network, said address reporting method comprising the steps of:
a) receiving a query for the address from the second network;
b) determining whether or not the address corresponding to the machine name designated in the query received in step a) is the unauthorized address;
c) preparing, when it is determined through step b) that the address corresponding to the machine name designated in the query is the unauthorized address, an address pair formed by the unauthorized address and the authorized address;
d) registering the address pair prepared in step c) in an address pair register table; and
e) returning the authorized address forming the address pair to the second network, when it is determined through step b) that the address corresponding to the machine name designated in the query is the unauthorized address.

2. An address reporting method for returning, when a query requesting an address corresponding to a machine name for a machine on a first network provided with a plurality of authorized addresses and a plurality of unauthorized addresses is issued from a second network, the requested address to the second network, said address reporting method comprising the steps of:
a) receiving a query for the address from the second network;
b) determining whether or not the address corresponding to the machine name designated in the query received in step a) is one of the plurality of unauthorized addresses;
c) preparing, when it is determined through step b) that the address corresponding to the machine name designated in the query is the unauthorized address, an address pair formed by the unauthorized address and the one of the plurality of authorized addresses;
d) registering the address pair prepared in step c) in an address pair register table; and
e) returning the authorized address forming the address pair to the second network, when it is determined through step b) that the address corresponding to the machine name designated in the query is one of the plurality of unauthorized addresses.

3. The address reporting method as claimed in claim 2, wherein there is provided an address mapping table by which one of the plurality of authorized addresses can be identified by specifying one of the unauthorized addresses, said address reporting method further comprising the step of f) reading, when it is determined through step b) that the address corresponding to the machine name designated in the query from the second network is one of the plurality of unauthorized addresses, one of the authorized addresses registered in the address mapping table, and said address pair including the authorized address read through step f) being prepared through step c).

4. An address reporting method for returning when a query requesting an address corresponding to a machine name for a machine on a first network provided with a plurality of authorized addresses and a plurality of unauthorized addresses is issued from a second network, the requested address to the second network, said address reporting method comprising the steps of:
a) receiving a query for the address from the second network;
b) determining whether or not the address corresponding to the machine name designated in the query received in step a) is one of the plurality of unauthorized addresses:
c) preparing, when it is determined through step b) that the address corresponding to the machine name designated in the query is the unauthorized address, an address pair formed by the unauthorized address and the one of the plurality of authorized addresses;
d) registering the address pair prepared in step c) in an address pair register table;
e) returning the authorized address forming the address pair to the second network, when it is determined through step b) that the address corresponding to the machine name is designated in the query is one of the plurality of unauthorized addresses;
f) determining, when it is determined that the address corresponding to the machine name designated in the query is one of the plurality of unauthorized addresses, whether or not the address pair that contains the unauthorized address corresponding to the host name designated in the query is registered in the address pair register table;
g) reading, when it is determined through step g) that the address pair that contains the unauthorized address corresponding to the machine name designated in the query is registered in the address pair register table, the authorized address forming the address pair from the address pair register table;

h) specifying, when it is determined through step f) that the address pair that contains the unauthorized address corresponding to the machine name designated in the query is not registered in the address pair register table, one of the plurality of authorized addresses not registered in the address pair register table; and i) registering an address pair formed by the unauthorized address corresponding to the machine name designated in the query and the authorized address specified through step h) in the address pair register table, wherein when the authorized address is read from the address pair register table through step h), the authorized address read is returned to the second network in step e), and when the authorized address is specified through step h), the specified address is returned to the second network in step e).

5. The address reporting method as claimed in claim 4, wherein there is provided an address mapping table by which one of the plurality of authorized addresses can be identified by specifying one of the unauthorized addresses, the address mapping table being searched in step h) so as to specify one of the authorized addresses forming a pair with the unauthorized address corresponding to the machine name designated in the query from the second network, and said address reporting method further comprising the step of j) reading the authorized address specified in step h) from the address mapping table.

6. The address reporting method as claimed in claim 1, further comprising the steps of:

l) adding data relating to an permitted survival period to information returned to the second network; and m) deleting from the address pair register table the address pair that contains the authorized address returned to the second network after the permitted survival period has expired.

7. The address reporting method as claimed in claim 1, further comprising the steps of:

n) adding data relating to an permitted survival period to information returned to the second network; and o) deleting from the address pair register table the address pair that contains the authorized address returned to the second network, wherein the permitted survival period is set to match a registration period during which the address pair can remain registered in the address pair register table.

8. The address reporting method as claimed in claim 2, further comprising the steps of:

g) adding data relating to an permitted survival period to information returned to the second network; and h) deleting from the address pair register table the address pair that contains the authorized address returned to the second network, wherein the permitted survival period is set such that it matches a registration period during which the address pair can remain registered in the address pair register table, and is in inverse proportion to the number of addresses pairs registered in the address pair register table.

9. An address reporting apparatus for returning, when a query for an address corresponding to a machine name of a machine on a first network is issued from a second network, the requested address to the second network, using authorized address storing means for storing an authorized address in the first network, said address reporting apparatus comprising:

unauthorized address storing means storing an unauthorized address in the first network;

receiving means receiving the query for the address from the second network;

address determining means determining whether the address corresponding to the machine name designated in the query received by the receiving means is the authorized address stored in the authorized address storing means or the unauthorized address stored in the unauthorized address storing means;

address pair preparing means preparing, when it is determined by the address determining means that the address corresponding to the machine designated in the query is the unauthorized address, the address pair formed by the unauthorized address and the authorized address;

address pair registering means storing the address pair prepared by the address pair preparing means in an address pair register table; and address reporting means reporting, when it is determined by the address determining means that the address corresponding to the machine name designated in the query is the unauthorized address, the authorized address forming the address pair with the unauthorized address to the second network.

10. An address reporting apparatus for returning, when a query for an address corresponding to a machine name of a machine on a first network is issued from a second network, the requested address to the second network, using authorized address storing means for storing a plurality of authorized addresses in the first network, said address reporting apparatus comprising:

unauthorized address storing means storing a plurality of unauthorized addresses in the first network;

receiving means receiving the query for the address from the second network;

address determining means determining whether the address corresponding to the machine name designated in the query received by the receiving means is one of the plurality of authorized addresses stored in the authorized address storing means or one of the plurality of unauthorized addresses stored in the unauthorized address storing means;

address pair preparing means preparing, when it is determined by the address determining means that the address corresponding to the machine designated in the query is one of the plurality of unauthorized addresses, the address pair formed by the unauthorized address and one of the plurality of authorized addresses;

address pair registering means storing the address pair prepared by the address pair preparing means in an address pair register table; and address reporting means reporting, when it is determined by the address determining means that the address corresponding to the machine name designated in the query is one of the plurality of unauthorized addresses, the authorized address forming the address pair with the unauthorized address to the second network.

11. The address reporting apparatus as claimed in claim 10, wherein there is provided an address mapping table by which one of the plurality of authorized addresses can be identified by specifying one of the unauthorized addresses, said address reporting apparatus further comprising address mapping table reading means reading, when it is determined by the address determining means that the address corresponding to the machine name designated in the query from the second network is one of the plurality of unauthorized addresses, one of the authorized addresses registered in the address mapping table, and the address pair preparing means preparing the address pair that contains the authorized address read by the address mapping table reading means.

12. An address reporting apparatus for returning, when a query for an address corresponding to a machine name of a machine on a first network is issued from a second network, the requested address to the second network, using authorized address storing means for storing a plurality of authorized addresses in the first network, said address reporting apparatus comprising:

unauthorized address storing means storing a plurality of unauthorized addresses in the first network;

receiving means receiving the query for the address from the second network;

address determining means determining whether the address corresponding to the machine name designated in the query received by the receiving means is one of the plurality of authorized addresses stored in the authorized address storing means or one of plurality of unauthorized addresses stored in the unauthorized address storing means;

address pair preparing means preparing, when it is determined by the address determining means that the address corresponding to the machine designated in the query is one of the plurality of unauthorized addresses, the address pair formed by the unauthorized address and one of the plurality of authorized addresses;

address pair registering means storing the address pair prepared by the address pair preparing means in an address pair register table;

address reporting means reporting, when it is determined by the address determining means that the address corresponding to the machine name designated in the query is one of the plurality of unauthorized addresses, the authorized address forming the address pair with the unauthorized address to the second network;

registration determining means determining, when it is determined that the address corresponding to the machine name designated in the query is one of the plurality of unauthorized addresses, whether or not the address pair that contains the unauthorized address corresponding to the machine name designated in the query is registered in the address pair register table;

address pair register table reading means reading, when it is determined by the registration determining means that the address pair that contains the unauthorized address corresponding to the machine name designated in the query, the address pair register table; and address specifying means specifying, when it is determined by the registration determining means that the address pair that contains the unauthorized address corresponding to the machine name designated in the query is not registered in the address pair register table, one of the authorized addresses from among the plurality of authorized addresses not registered in the address pair register table, wherein the address pair registering means registers the address pair formed by the address corresponding to the machining name designated in the query and the authorized address specified by the address specifying means, in the address pair register table, and the address reporting means returns, when the authorized address is read by the address pair register table reading means from the address pair register table, the authorized address read to the second network, or returns, when one of the authorized addresses is specified by the address specifying means, the specified authorized address to the second network.

13. The address reporting apparatus as claimed in claim 12, wherein there is provided an address mapping table by which one of the plurality of authorized addresses can be identified by specifying one of the unauthorized addresses, and the address specifying means searches the address mapping table so as to read therefrom one of the authorized addresses forming a pair with the unauthorized address corresponding to the machine name designated in the query from the second network.

14. The address reporting apparatus as claimed in claim 9, further comprising:

permitted survival period data adding means adding data relating to an permitted survival period of information returned to the second network; and address pair deleting means deleting the address pair that contains the authorized address returned to the second network from the address pair register table when the permitted survival period has expired.

15. The address reporting apparatus as claimed in claim 9, further comprising:

permitted survival period data adding means adding data relating to an permitted survival period to information returned to the second network; and address pair deleting means deleting the address pair that contains the authorized address returned to the second network from the address pair register table, wherein the permitted survival period is set to match a registration period during which the address pair can remain registered in the address pair register table.

16. The address reporting apparatus as claimed in claim 10, further comprising:

permitted survival period data adding means adding data relating to an permitted survival period to information returned to the second network; and address pair deleting means deleting the address pair that contains the authorized address returned to the second network from the address pair register table, wherein the permitted survival period is set such that it matches a registration period during which the address pair can remain registered in the address pair register table, and is in inverse proportion to the number of addresses pairs registered in the address pair register table.

17. An address reporting system for returning, when a query for an address corresponding to a machine name of a machine on a first network having an authorized address and an unauthorized address is issued from a second network communicable with the first network, the requested address to the second network, said address reporting system comprising:

authorized address storing means storing an authorized address;

unauthorized address storing means storing an unauthorized address;

receiving means receiving the query for the address from the second network;

address determining means determining whether the address corresponding to the machine name designated in the query received by the receiving means is the authorized address stored in the authorized address storing means or the unauthorized address stored in the unauthorized address storing means;

address pair preparing means preparing, when it is determined by the address determining means that the address corresponding to the machine designated in the query is the unauthorized address, the address pair formed by the unauthorized address and the authorized address;

address pair registering means storing the address pair prepared by the address pair preparing means in an address pair register table; and address reporting means reporting, when it is determined by the address determining means that the address corresponding to the machine name designated in the query is the unauthorized address, the authorized address forming the address pair with the unauthorized address to the second network.

18. An address reporting system for returning, when a query for an address corresponding to a machine name of a machine on a first network having a plurality of authorized addresses and a plurality of unauthorized addresses is issued from a second network communicable with the first network, the requested address to the second network, said address reporting system comprising:

authorized address storing means storing the plurality of authorized addresses;

unauthorized address storing means storing the plurality of unauthorized addresses;

receiving means receiving the query for the address from the second network;

address determining means determining whether the address corresponding to the machine name designated in the query received by the receiving means is the authorized address stored in the authorized address storing means or the unauthorized address stored in the unauthorized address storing means;

address pair preparing means preparing, when it is determined by the address determining means that the address corresponding to the machine designated in the query is the unauthorized address, the address pair formed by the unauthorized address and the authorized address;

address pair registering means storing the address pair prepared by the address pair preparing means in an address pair register table; and address reporting means reporting, when it is determined by the address determining means that the address corresponding to the machine name designated in the query is the unauthorized address, the authorized address forming the address pair with the unauthorized address to the second network.

19. The address reporting system as claimed in claim 18, wherein there is provided an address mapping table by which one of the plurality of authorized addresses can be identified by specifying one of the unauthorized addresses, said address reporting system further comprising address mapping table reading means reading, when it is determined by the address determining means that the address corresponding to the machine name designated in the query from the second network is one of the plurality of unauthorized addresses, one of the authorized addresses registered in the address mapping table, and the address pair preparing means preparing the address pair that contains the authorized address read by the address mapping table reading means.

20. An address reporting system for returning, when a query for an address corresponding to a machine name of a machine on a first network having a plurality of authorized addresses and a plurality of unauthorized addresses is issued from a second network communicable with the first network, the requested address to the second network, said address reporting system comprising:

authorized address storing means storing the plurality of authorized addresses;

unauthorized address storing means storing the plurality of unauthorized addresses;

receiving means receiving the query for the address from the second network:

address determining means determining whether the address corresponding to the machine name designated in the query received by the receiving means is the authorized address stored in the authorized address storing means or the unauthorized address stored in the unauthorized address storing means;

address pair preparing means preparing, when it is determined by the address determining means that the address corresponding to the machine designated in the query is the unauthorized address, the address pair formed by the unauthorized address and the authorized address:

address pair registering means storing the address pair prepared by the address pair preparing means in an address pair register table;

address reporting means reporting, when it is determined by the address determining means that the address corresponding to the machine name designated in the query is the unauthorized address, the authorized address forming the address pair with the unauthorized address to the second network;

registration determining means determining, when it is determined that the address corresponding to the machine name designated in the query is one of the plurality of unauthorized addresses, whether or not the address pair that contains the unauthorized address corresponding to the machine name designated in the query is registered in the address pair register table;

address pair register table reading means reading, when it is determined by the registration determining means that the address pair that contains the unauthorized address corresponding to the machine name designated in the query, the authorized address forming the address pair from the address pair register table; and address specifying means specifying, when it is determined by the registration determining means that the address pair that contains the unauthorized address corresponding to the machine name designated in the query is not registered in the address pair register table, one of the authorized addresses from among the plurality of authorized addresses not registered in the address pair register table, wherein the address pair registering means registers the address pair formed by the address corresponding to the machine name designated in the query and authorized address specified by the address specifying means, in the address pair register table, and the address reporting means returns, when the authorized address is read by the address pair register table reading means from the address pair register table, the authorized address read to the second network, or returns, when one of the authorized addresses is specified by the address specifying means, the specified authorized address to the second network.

21. The address reporting system as claimed in claim 20, wherein there is provided an address mapping table by which one of the plurality of authorized addresses can be identified by specifying one of the unauthorized addresses, and the address specifying means searches the address mapping table so as to read therefrom one of the authorized addresses forming a pair with the unauthorized address corresponding to the machine name designated in the query from the second network.

22. The address reporting system as claimed in claim 17, further comprising:

permitted survival period data adding means adding data relating to an permitted survival period of information returned to the second network; and address pair deleting means deleting the address pair that contains the authorized address returned to the second network from the address pair register table when the permitted survival period has expired.

23. The address reporting system as claimed in claim 17, further comprising:

permitted survival period data adding means adding data relating to an permitted survival period to information returned to the second network; and address pair deleting means deleting the address pair that contains the authorized address returned to the second network from the address pair register table, wherein the permitted survival period is set to match a registration period during which the address pair can remain registered in the address pair register table.

24. The address reporting system as claimed in claim 18, further comprising:

permitted survival period data adding means adding data relating to an permitted survival period to information returned to the second network; and address pair deleting means deleting the address pair that contains the authorized address returned to the second network from the address pair register table, wherein the permitted survival period is set such that it matches a registration period during which the address pair can remain registered in the address pair register table, and is in inverse proportion to the number of addresses pairs registered in the address pair register table.

25. An address reporting apparatus for returning, when a query for an address corresponding to a machine name of a machine on a first network is issued from a second network, the requested address to the second network, using an authorized address storing device for storing at least one authorized address in the first network, the address reporting apparatus comprising:

an address determining device determining whether the address corresponding to the machine name designated in the query is one of the at least one authorized addresses stored in the authorized address storing device or one of at least one unauthorized addresses stored in an unauthorized address storing device;

an address pair preparing device preparing, when it is determined by the address determining device that the address corresponding to the machine designated in the query is one of the at least one unauthorized addresses, the address pair formed by the unauthorized address and one of the at least one authorized addresses and storing the address pair in an address pair register table; and an address reporting device reporting, when it is determined by the address determining device that the address corresponding to the machine name designated in the query is one of the at least one unauthorized addresses, the authorized address forming the address pair with the unauthorized address to the second network.

* * * * *

UNITED STATES PATENT AND TRADEMARK OFFICE
CERTIFICATE OF CORRECTION

PATENT NO.: 5,815,664
DATED : September 29, 1998
INVENTOR(S): Kazuo ASANO

It is certified that error appears in the above-identified patent and that said Letters Patent is hereby corrected as shown below:

Col. 14, line 38, change ".," to --,--.

Col. 24, line 32, change "S1" to --S11--.

Col. 30, line 34, after "returning" insert --,--.

Signed and Sealed this

Second Day of March, 1999

Attest:

Attesting Officer

Q. TODD DICKINSON

Acting Commissioner of Patents and Trademarks